United States Patent
Mori

(10) Patent No.: US 12,339,569 B2
(45) Date of Patent: Jun. 24, 2025

(54) DRIVE DEVICE AND OPTICAL DEVICE

(71) Applicant: FUJIFILM Corporation, Tokyo (JP)

(72) Inventor: Yasuhiro Mori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 216 days.

(21) Appl. No.: 18/185,995

(22) Filed: Mar. 17, 2023

(65) Prior Publication Data

US 2023/0305367 A1    Sep. 28, 2023

(30) Foreign Application Priority Data

Mar. 24, 2022  (JP) .................. 2022-047901

(51) Int. Cl.
*G03B 17/12*  (2021.01)
*G03B 13/34*  (2021.01)

(52) U.S. Cl.
CPC ............. *G03B 17/12* (2013.01); *G03B 13/34* (2013.01); *G03B 2205/0069* (2013.01)

(58) Field of Classification Search
CPC . G03B 17/12; G03B 2205/0069; G03B 13/34
See application file for complete search history.

(56) References Cited

U.S. PATENT DOCUMENTS

| | | | |
|---|---|---|---|
| 2016/0147037 A1* | 5/2016 | Arai | G02B 7/14 |
| | | | 359/754 |
| 2023/0305364 A1* | 9/2023 | Hideshima | G03B 13/36 |

FOREIGN PATENT DOCUMENTS

| | | | | |
|---|---|---|---|---|
| JP | 2000147350 A | * | 5/2000 | |
| JP | 2011075674 A | * | 4/2011 | |
| JP | 4751688 B2 | * | 8/2011 | |
| JP | 2013-076944 A | | 4/2013 | |
| JP | 2016-116352 A | | 6/2016 | |

* cited by examiner

*Primary Examiner* — Christopher E Mahoney
(74) *Attorney, Agent, or Firm* — Studebaker Brackett PLLC

(57) ABSTRACT

A drive device includes a magnetic circuit unit including a first magnet, a second magnet, a first yoke that holds the first magnet and the second magnet, and a second yoke disposed between the first magnet and the second magnet, a first coil that is bonded to a first zoom lens and corresponds to the first magnet, and a second coil that is bonded to a second zoom lens and corresponds to the second magnet, in which the magnetic circuit unit drives the first coil and the second coil, and a thickness of the second yoke is larger than a thickness of the first yoke.

12 Claims, 19 Drawing Sheets

DRIVE DEVICE AND OPTICAL DEVICE

CROSS-REFERENCE TO RELATED APPLICATIONS

This application claims priority under 35 U.S.C § 119(a) to Japanese Patent Application No. 2022-047901 filed on 24 Mar. 2022. The above application is hereby expressly incorporated by reference, in its entirety, into the present application.

BACKGROUND OF THE INVENTION

1. Field of the Invention

The present invention relates to a drive device that drives an optical system and an optical device.

2. Description of the Related Art

JP2016-116352A discloses a lens drive device that moves a driving coil provided in a movable lens portion of a camera in an optical axis direction by a magnetic circuit composed of a magnet and a yoke. In the lens drive device, a notch hole for communicating inside and outside is formed in a cylindrical lens barrel in which the movable lens portion is disposed, a part of the yoke constituting the magnetic circuit is attached to be located in the lens barrel, and the driving coil is disposed to be slidably fitted onto a part of the yoke. The lens drive device includes two or more movable lens portions, and is provided in common with respect to the movable lens portions having two or more yokes.

JP2013-76944A discloses a lens drive device comprising a movable portion that holds a lens, a substantially annular yoke member fixed to the movable portion, a permanent magnet fixed to an inner peripheral side of the yoke member, a coil which is fixed to a base, the coil passing through a space inside the yoke member and facing the permanent magnet, and a biasing unit that biases the movable portion in at least one direction along an optical axis direction of the lens. The yoke member is configured by joining a first yoke member and a second yoke member, and a joining portion between the first yoke member and the second yoke member is located at a substantially center portion of the permanent magnet in the optical axis direction of the lens.

SUMMARY OF THE INVENTION

One embodiment according to the technology of the present disclosure provides a drive device and an optical device capable of efficiently obtaining a thrust and reducing a size and a weight even in a case in which a movement amount in a case of driving an optical system is large and a weight of a movable portion is large.

An aspect according to the technology of the present disclosure relates to a drive device that drives a first optical system and a second optical system disposed along an optical axis direction, the device comprising a first member, a first coil, and a second coil, in which the first member drives the first coil by an electromagnetic force generated in the first coil and drives the second coil by an electromagnetic force generated in the second coil, and a thickness of a second yoke is larger than a thickness of a first yoke. The first coil is bonded to the first optical system and corresponds to a first magnet. The second coil is bonded to the second optical system and corresponds to a second magnet. The first member includes the first magnet, the second magnet disposed along the optical axis direction together with the first magnet, the first yoke that holds the first magnet and the second magnet, and the second yoke disposed between the first magnet and the second magnet.

It is preferable that the first yoke have a division portion at a position between the first magnet and the second magnet in the optical axis direction, and the second yoke be provided in the division portion. It is preferable that the second yoke be interposed between the first yokes divided at the position of the division portion.

It is preferable that the first yoke have a side surface disposed along the optical axis direction, and a groove portion that is located between the first magnet and the second magnet in the optical axis direction and is provided on the side surface, and the second yoke be disposed in the groove portion.

It is preferable that the drive device further comprise a position detection sensor, in which the first members are disposed in pairs at positions of the first optical system and the second optical system facing each other with an optical axis interposed therebetween, and the position detection sensor is located between the first members disposed in pairs and detects the positions of the first optical system and the second optical system.

It is preferable that the position detection sensor include a first position detection sensor that detects the position of the first optical system, and a second position detection sensor that detects the position of the second optical system, and the first position detection sensor and the second position detection sensor have different positions in a circumferential direction about the optical axis.

It is preferable that, in a case in which dimensions of the first magnet and the second magnet in the optical axis direction are length dimensions, dimensions of the first optical system and the second optical system in a tangential direction of a circle about an optical axis are width dimensions, a dimension in a radial direction intersecting the optical axis direction and the tangential direction is a thickness dimension, and a force generated by energizing the first coil and the second coil is a thrust, the width dimensions be set to dimensions in which a ratio of an increase amount of the thrust to an increase amount of the width dimension is equal to or more than a threshold value in a case in which the length dimensions and the thickness dimension are fixed values.

It is preferable that the first magnet and the second magnet have the width dimensions in which the ratio is equal to or more than the threshold value, and a plurality of the first magnets and a plurality of the second magnets be disposed in a circumferential direction of the circle, respectively. It is preferable that the length dimensions be set in accordance with movement amounts of the first optical system and the second optical system, respectively.

It is preferable that at least one of the first optical system or the second optical system have a weight equal to or more than 20 g and a dimension in the optical axis direction equal to or more than 15 mm.

It is preferable that the drive device further comprise a first holding member that holds the first optical system and the first coil, and a second holding member that holds the second optical system and the second coil, in which the first coil and the second coil interpose the second yoke and are disposed at positions facing each other, the first holding member includes a first holding portion that holds the first coil at a position opposite to the second yoke with respect to the first coil, and the second holding member includes a second holding portion that holds the second coil at a position opposite to the second yoke with respect to the second coil.

It is preferable that any one of the first yoke or the second yoke be formed with a protruding portion and the other thereof is formed with a recess portion, and the first yoke and the second yoke be bonded to each other by fitting the protruding portion into the recess portion.

It is preferable that the drive device further comprise a support member that supports the first yoke, in which the support member has an opening portion for inserting the second yoke into the groove portion from a direction orthogonal to the side surface.

Another aspect according to the technology of the present disclosure relates to an optical device comprising the drive device described above.

DESCRIPTION OF THE PREFERRED EMBODIMENTS

First Embodiment

Figure 1:
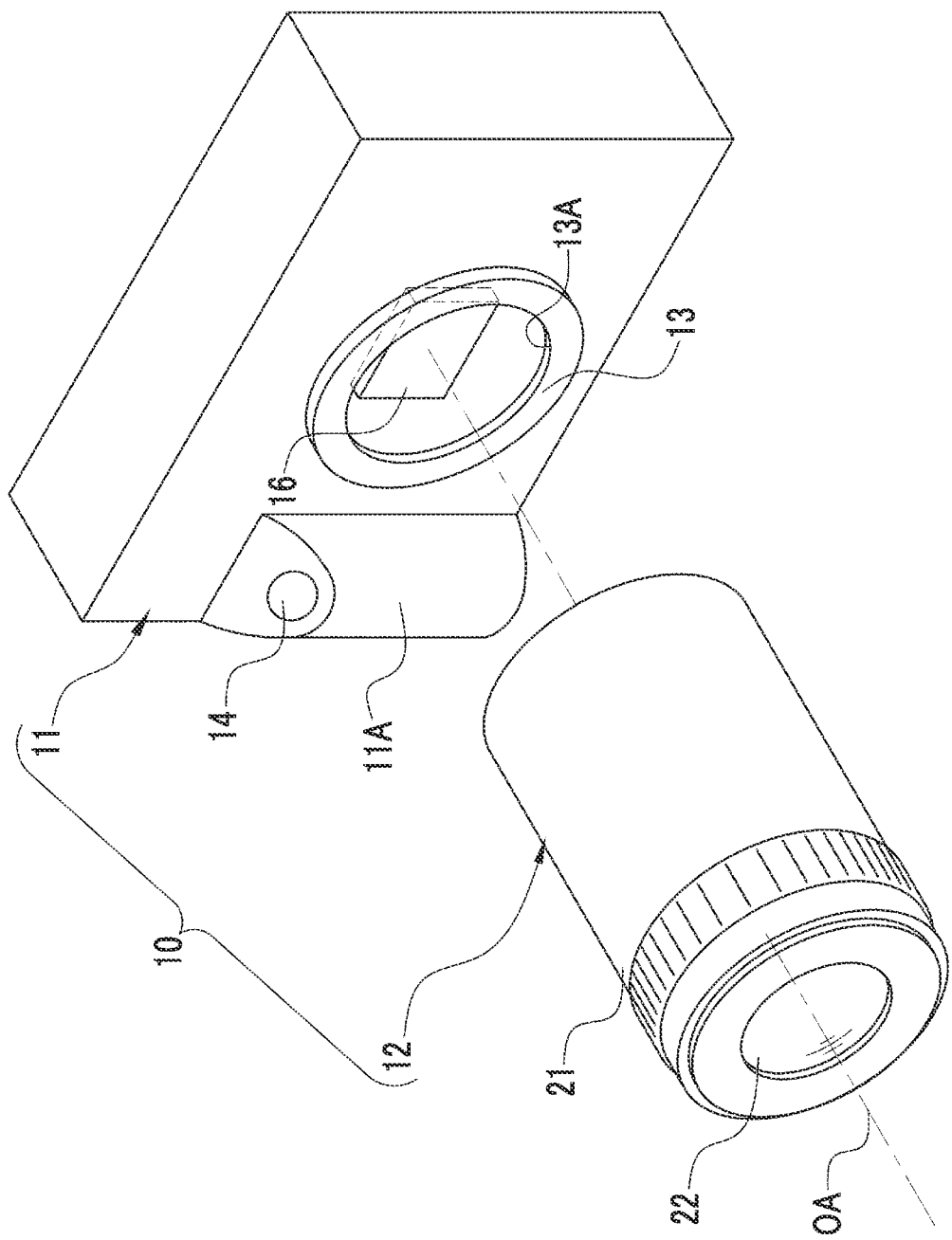
FIG. 1 is an exploded perspective view of a digital camera.

As shown in FIG. 1, a digital camera 10 comprises a camera body 11 and an interchangeable lens barrel 12. A lens mount 13, a release switch 14, a power switch (not shown), and the like are provided on a front surface of the camera body 11. The lens mount 13 has a circular-shaped imaging aperture 13A. The lens barrel 12 is attachably and detachably mounted on the lens mount 13. The lens barrel 12 is an example of an optical device according to the present invention.

An imaging element 16 is built in the camera body 11. The imaging element 16 is a complementary metal oxide semiconductor (CMOS) image sensor, a charge coupled device (CCD) image sensor, or an organic thin-film imaging element. The lens mount 13 is provided with a body-side signal contact 17 (see FIG. 14) inside the imaging aperture 13A for electrically connecting the lens mount 13 to the lens barrel 12 to perform the communication. Moreover, the camera body 11 has a grip portion 11A.

Figure 2:
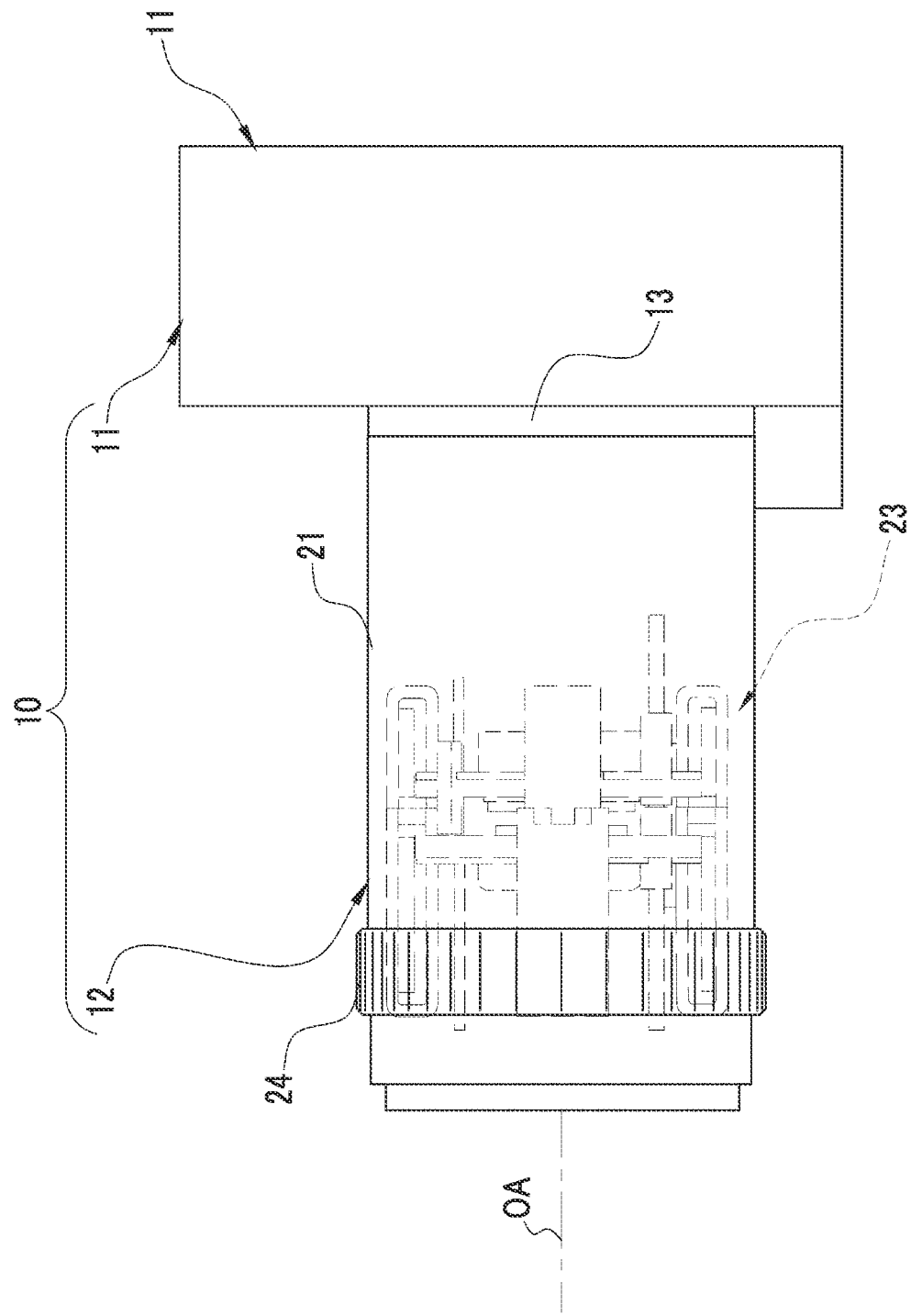
FIG. 2 is a side view of the digital camera.

As shown in FIG. 2, the lens barrel 12 comprises a lens barrel body 21, an imaging optical system 22, a drive device 23, and a zoom ring 24. The lens barrel body 21 has a cylindrical shape and holds the imaging optical system 22 and the drive device 23 therein, and is provided with a lens mount 25 (see FIGS. 3 and 14) and a lens-side signal contact 26 (see FIGS. 3 and 14) at a rear end thereof. The imaging optical system 22 images subject light on the imaging element 16 in a case in which the lens barrel 12 is mounted on the camera body 11.

Figure 3:
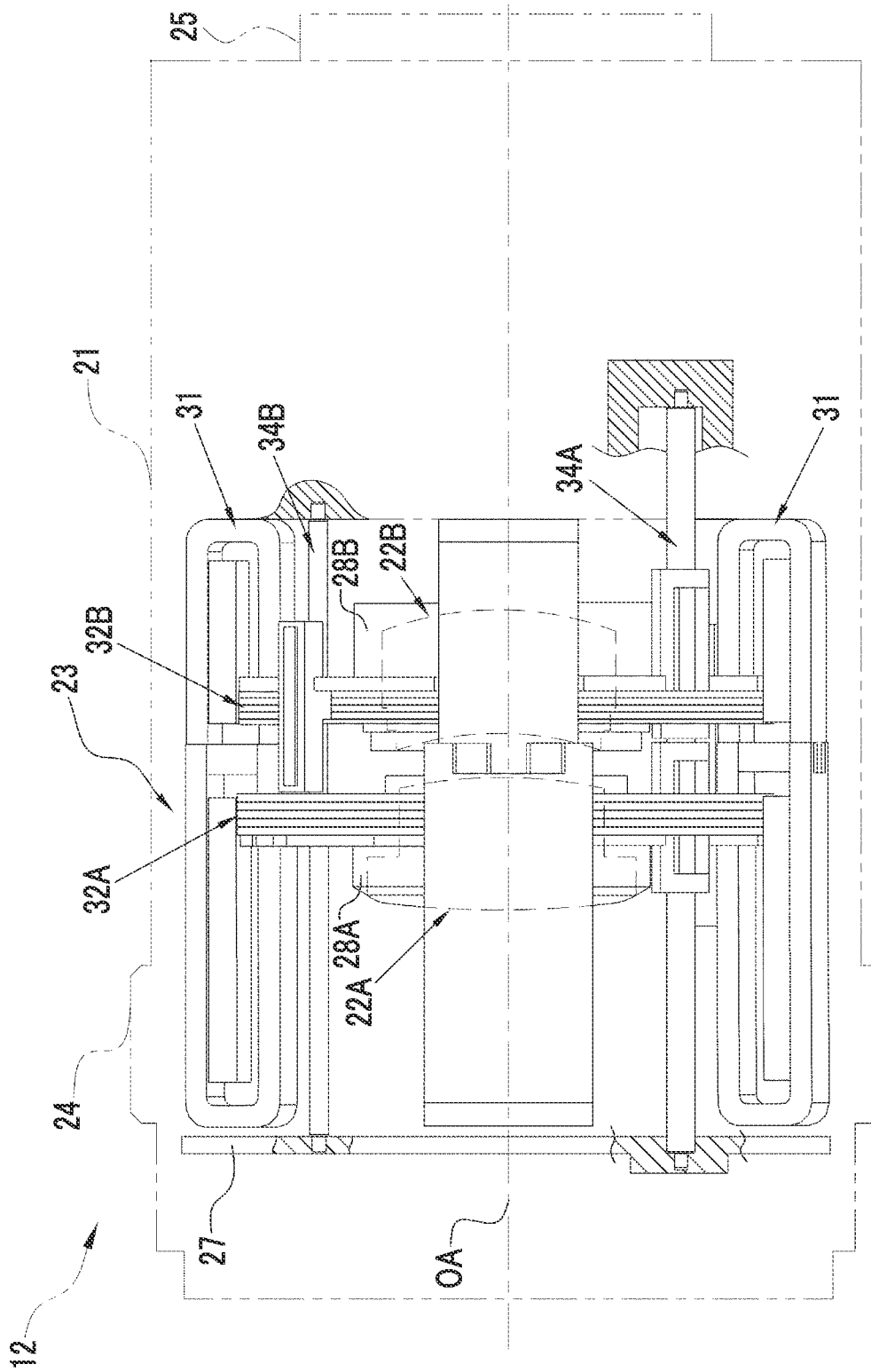
FIG. 3 is a cross-sectional view of a main part of a lens barrel.

As shown in FIG. 3, the drive device 23 is disposed inside the lens barrel 12. The drive device 23 is a voice coil motor (hereinafter, referred to as VCM) and drives a first zoom lens 22A and a second zoom lens 22B which are a part of the imaging optical system 22. The drive device 23 is attached to the lens barrel body 21 via an attachment member 27, and the like.

In the lens barrel 12, magnification is performed by changing an interval between the first zoom lens 22A and the second zoom lens 22B. The lens barrel 12 changes a focal length without changing a focus position by moving the first zoom lens 22A and the second zoom lens 22B. Specifically, in a case in which the first zoom lens 22A is moved to a subject side, the second zoom lens 22B is moved to an image plane side, and in a case in which the first zoom lens 22A is moved to the image plane side, the second zoom lens 22B is moved to the subject side. As a result, the focal length can be changed without changing the focus position. It should be noted that a maximum movement amount of movements of the first zoom lens 22A and the second zoom lens 22B in a magnification operation varies depending on an optical design.

The first zoom lens 22A is held by a first holding member 28A. The first holding member 28A is connected to a first coil 32A described below. On the other hand, the second zoom lens 22B is held by a second holding member 28B. The second holding member 28B is connected to a second coil 32B described below. The first zoom lens 22A and the second zoom lens 22B correspond to a first optical system and a second optical system within the scope of the claims, respectively.

Figure 4:
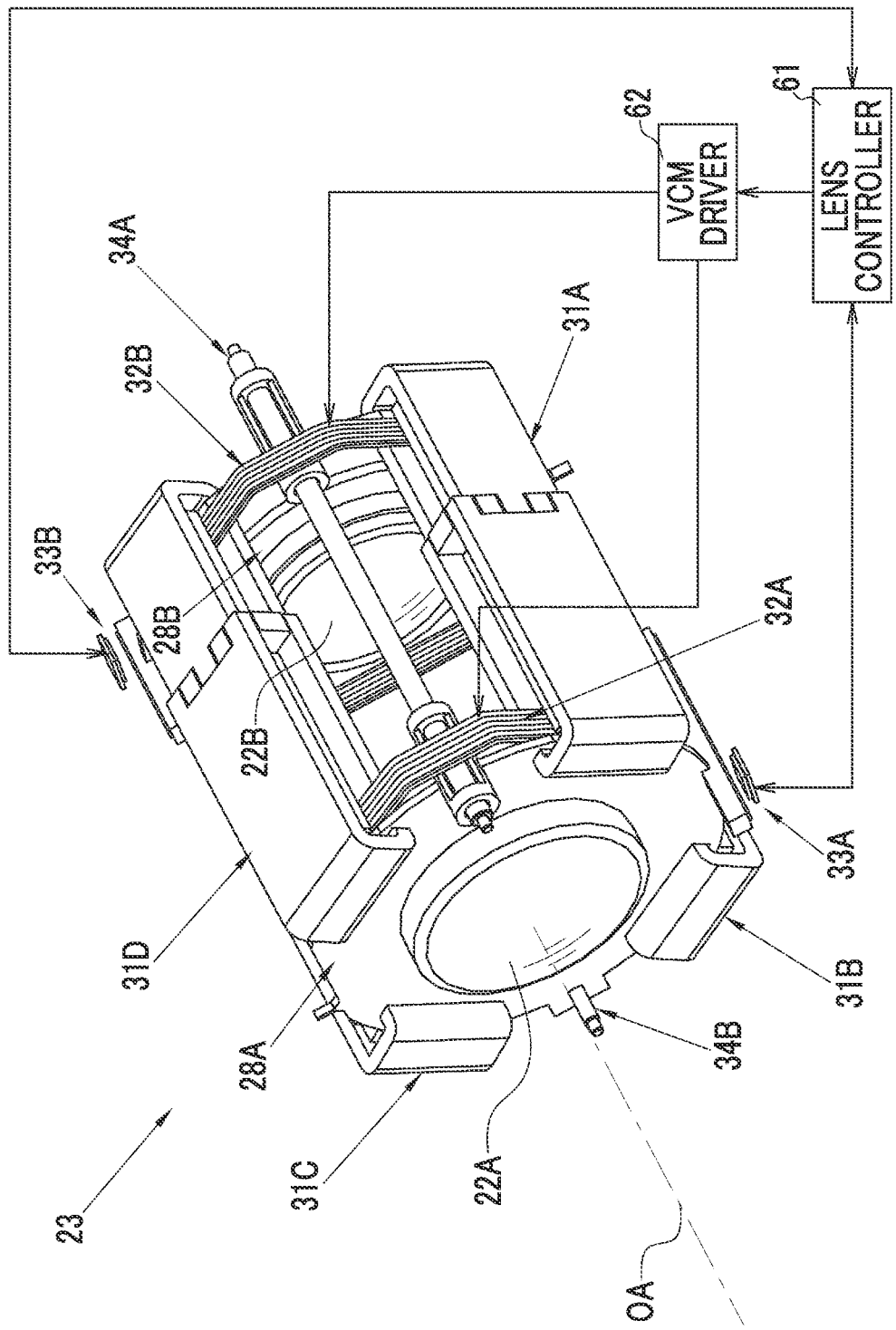
FIG. 4 is a perspective view of a drive device.

As shown in FIG. 4, the drive device 23 comprises magnetic circuit units 31A to 31D, the first holding member 28A, the second holding member 28B, the first coil 32A, the second coil 32B, a first position detection sensor 33A, a second position detection sensor 33B, a first guide shaft 34A, a second guide shaft 34B, a lens controller 61, and a VCM driver 62.

Hereinafter, a magnetic circuit unit 31, or the magnetic circuit unit 31A, the magnetic circuit unit 31B, the magnetic circuit unit 31C, and the magnetic circuit unit 31D will be described. A case in which the magnetic circuit unit 31 is simply described includes the description common to all of the magnetic circuit units 31 without being specified in any one of the above, and a case in which the magnetic circuit unit 31A, the magnetic circuit unit 31B, the magnetic circuit unit 31C, and the magnetic circuit unit 31D are described is for describing the magnetic circuit unit 31 disposed at a specific position. It should be noted that the magnetic circuit unit 31 corresponds to a first member within the scope of the claims.

The lens controller 61 controls the energization of the first coil 32A and the second coil 32B via the VCM driver 62. Moreover, as will be described below, the lens controller 61 controls each unit of the lens barrel 12.

Figure 5:
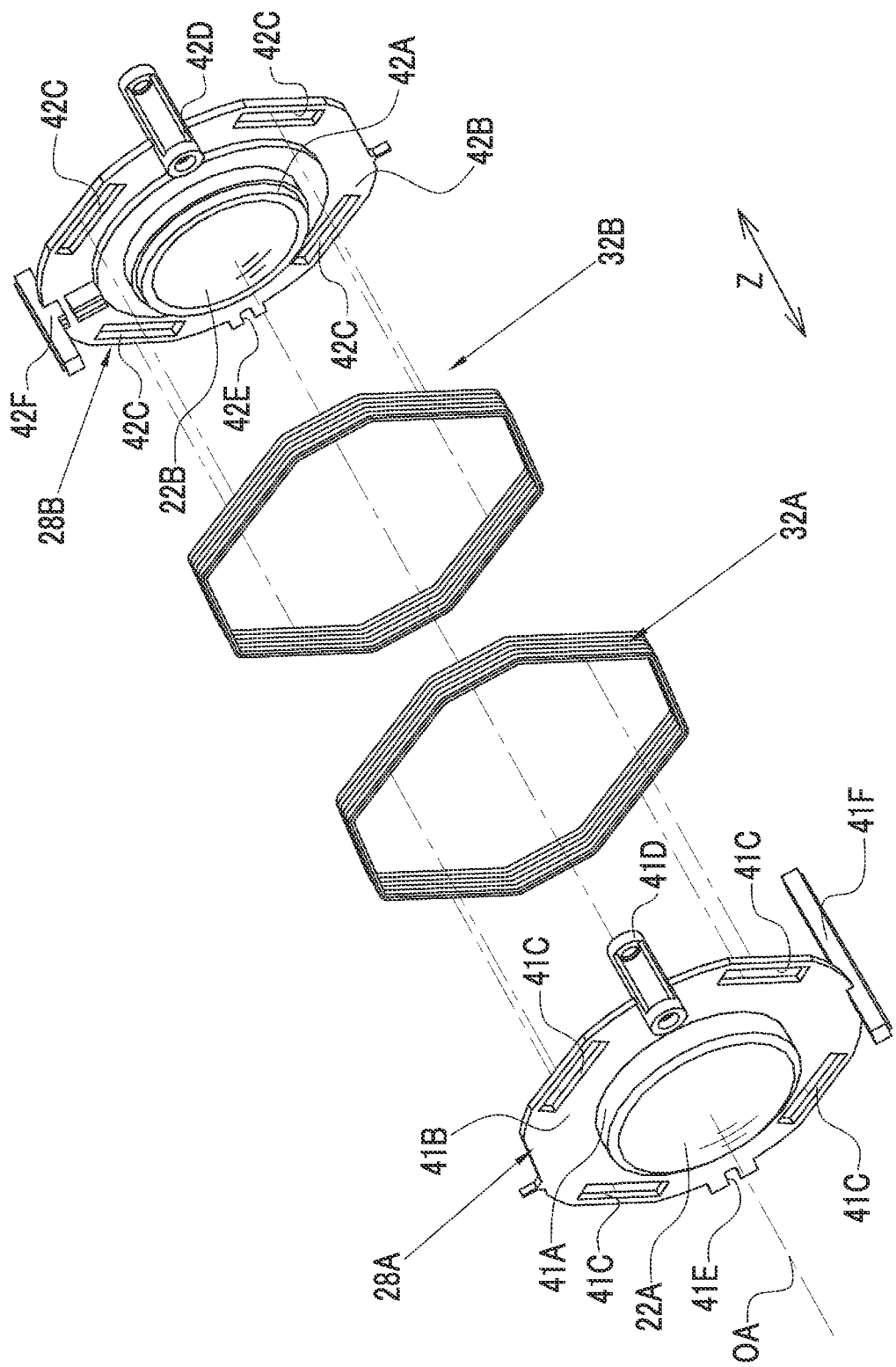
FIG. 5 is an exploded perspective view of a first coil, a second coil, a first holding member, and a second holding member.

As shown in FIG. 5, the first coil 32A is formed by being wound around in an octagonal shape having four sides matching the positions of four first magnets 45 described below, and four sides connecting the four sides. The second coil 32B is also formed by being wound around in an octagonal shape similarly to the first coil 32A. The first coil 32A is bonded to the first holding member 28A. That is, the first coil 32A is bonded to the first zoom lens 22A via the first holding member 28A. The first holding member 28A has a cylindrical portion 41A and a flange portion 41B.

The cylindrical portion 41A holds the first zoom lens 22A. The flange portion 41B protrudes from an outer peripheral surface of the cylindrical portion 41A. An outer shape of the flange portion 41B is formed in an octagonal shape corresponding to the first coil 32A. The first coil 32A is fixed to the flange portion 41B. As a result, the first coil 32A is disposed around an optical axis OA. The optical axis OA is an optical axis of the first zoom lens 22A and the second zoom lens 22B. The first zoom lens 22A and the second zoom lens 22B are disposed such that the positions of the optical axes OA of the first zoom lens 22A and the second zoom lens 22B match.

In the flange portion 41B, four through-holes 41C, a guide tube 41D, a guide groove 41E, and a sensor holding portion 41F are integrally formed. A first yoke 47A described below is inserted into the through-hole 41C. The through-hole 41C is formed on an inner side than a portion in which the first coil 32A is fixed to the flange portion 41B. The first guide shaft 34A is movably fitted into an inner peripheral surface of the guide tube 41D. Moreover, the guide groove 41E is provided at a position that is rotationally symmetrical about the guide tube 41D and the optical axis OA by 180 degrees. The second guide shaft 34B is movably fitted into the guide groove 41E.

The sensor holding portion 41F is provided at a position outside the first coil 32A. The sensor holding portion 41F holds a position detection magnet 55 (see FIGS. 9 and 13) constituting the first position detection sensor 33A. The first position detection sensor 33A will be described below.

The second coil 32B is bonded to the second holding member 28B. That is, the second coil 32B is bonded to the second zoom lens 22B via the second holding member 28B. The second holding member 28B has a cylindrical portion 42A and a flange portion 42B. An outer shape of the flange portion 42B is formed in an octagonal shape corresponding to the second coil 32B. In the flange portion 42B, four through-holes 42C, a guide tube 42D, a guide groove 42E, and a sensor holding portion 42F are integrally formed.

A first yoke 47B described below is inserted into the through-hole 42C. The through-hole 42C is formed on an inner side than a portion in which the first coil 32A is fixed to the flange portion 41B. The first guide shaft 34A is movably fitted into an inner peripheral surface of the guide tube 42D. Moreover, the guide groove 42E is provided at a position that is rotationally symmetrical about the guide tube 42D and the optical axis OA by 180 degrees. The second guide shaft 34B is movably fitted into the guide groove 42E.

The sensor holding portion 42F is provided at a position outside the second coil 32B. The sensor holding portion 42F holds a position detection magnet 55 (see FIGS. 9 and 13) constituting the second position detection sensor 33B. The second position detection sensor 33B will be described below.

Figure 6:
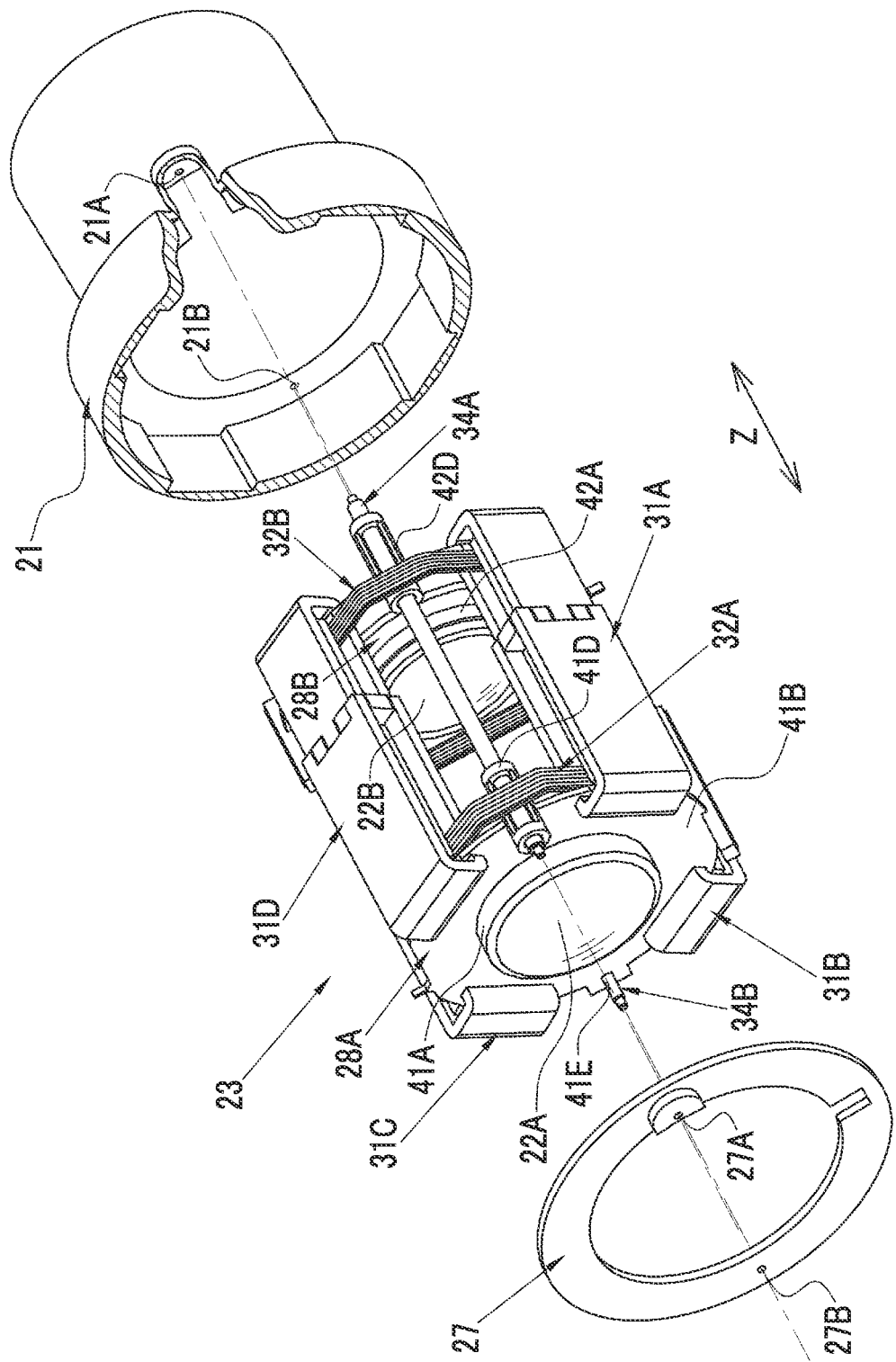
FIG. 6 is a perspective view showing a step of supporting the drive device on a lens barrel body.

As shown in FIG. 6, the first guide shaft 34A and the second guide shaft 34B are fixed to the inside of the lens barrel body 21 in a state of being fitted into the guide tubes 41D and 42D and the guide grooves 41E and 42E. Specifically, the base end portions of the first guide shaft 34A and the second guide shaft 34B are fitted into fixing holes 21A and 21B provided inside the lens barrel body 21. On the other hand, the distal end portions of the first guide shaft 34A and the second guide shaft 34B are fitted into the fixing holes 27A and 27B provided in the attachment member 27. The attachment member 27 is bonded to the lens barrel body 21. That is, the distal end portions of the first guide shaft 34A and the second guide shaft 34B are bonded to the inside of the lens barrel body 21 via the attachment member 27. It should be noted that, in FIG. 6, for convenience of description, the lens barrel body 21 is shown in a state of omitting or cutting out a part thereof.

As described above, the first guide shaft 34A and the second guide shaft 34B are fixed to the inside of the lens barrel body 21 and are disposed along a Z-axis direction (optical axis direction). As a result, the first guide shaft 34A and the second guide shaft 34B guide the first holding member 28A and the second holding member 28B, that is, the first zoom lens 22A and the second zoom lens 22B in the Z-axis direction. The Z-axis direction is a direction along the optical axis OA. As described above, the first zoom lens 22A and the second zoom lens 22B have the matching positions of the optical axes OA, and are guided by the first guide shaft 34A and the second guide shaft 34B. That is, the first zoom lens 22A and the second zoom lens 22B are provided to be movable within a predetermined range in the Z-axis direction.

Figure 7:
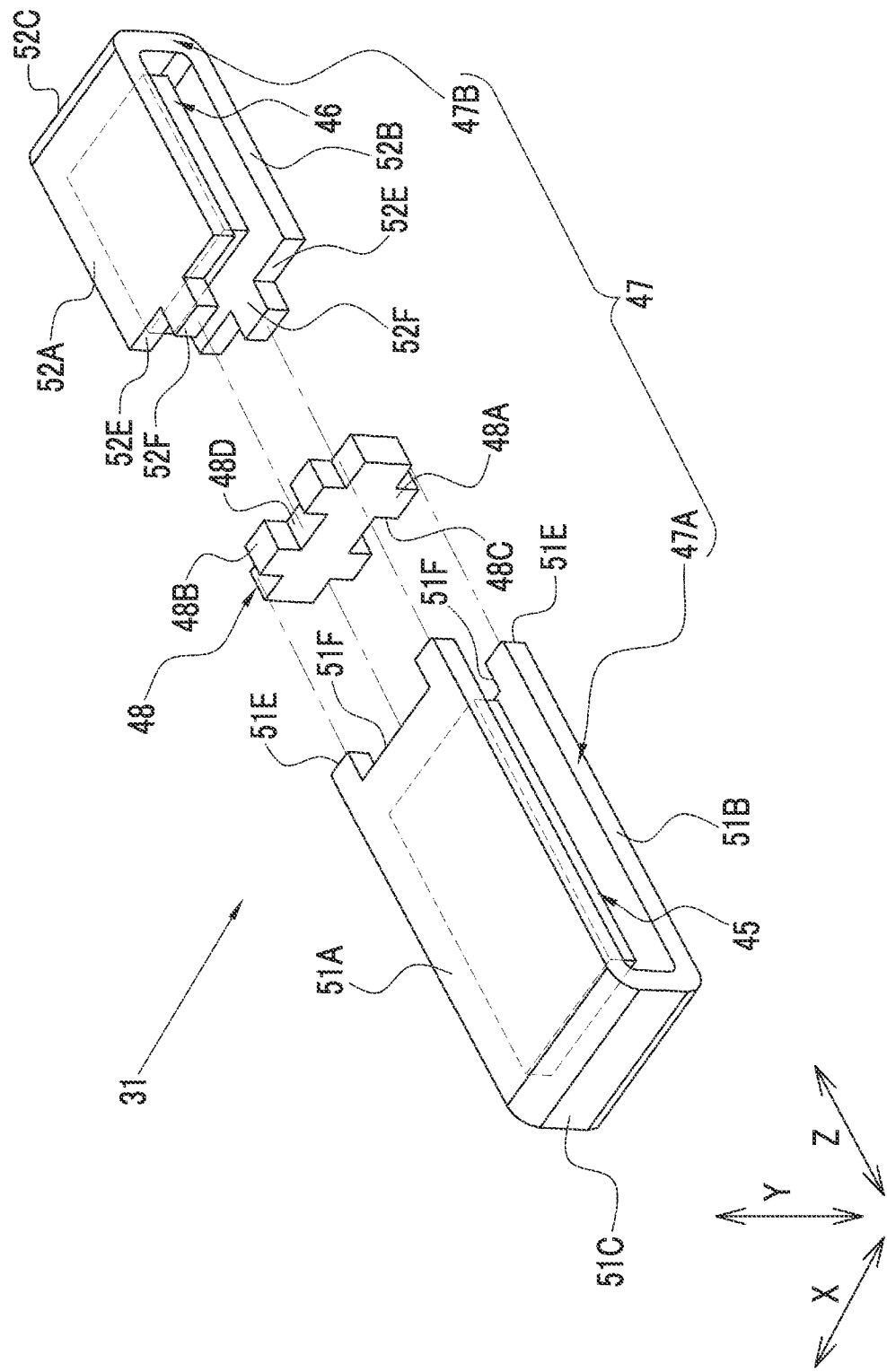
FIG. 7 is an exploded perspective view of a first yoke, a second yoke, a first magnet, and a second magnet.

As shown in FIG. 7, the magnetic circuit unit 31 comprises the first magnet 45, the second magnet 46, the first yoke 47, and the second yoke 48. The first yoke 47 and the second yoke 48 are formed of a magnetic material, such as iron. The first yoke 47 is divided into two portions of the first yoke 47A and the first yoke 47B.

The first yoke 47A and the first yoke 47B are formed in a bent shape. Specifically, the first yoke 47A and the first yoke 47B are formed in a U-shape.

Figure 8:
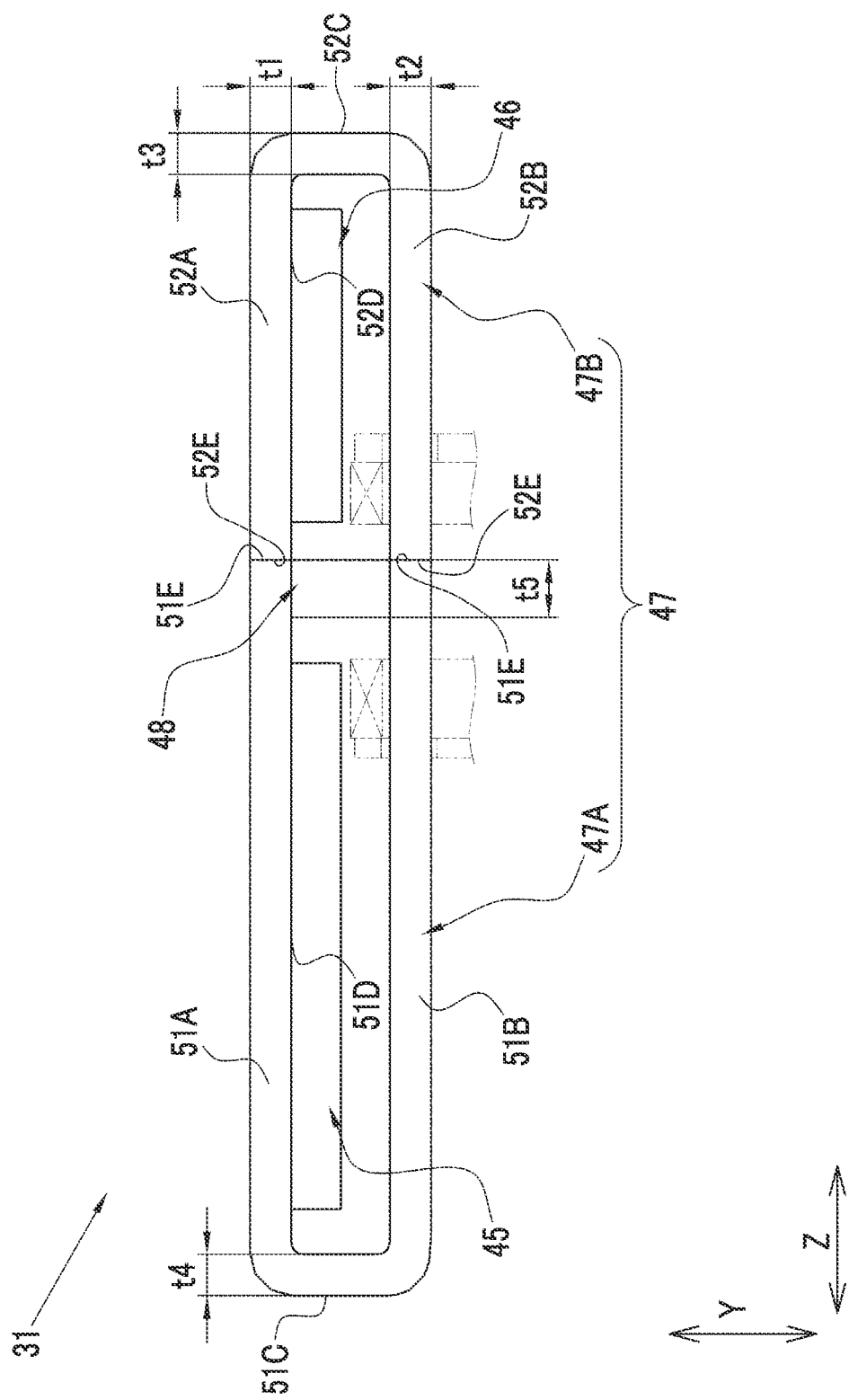
FIG. 8 is a side view of a magnetic circuit unit.

As shown in FIG. 8, the first yoke 47A is located on the distal end side (subject side) in the Z-axis direction. The first yoke 47A has an outer flat plate portion 51A, an inner flat plate portion 51B, and a folded-back portion 51C connecting the flat plate portions 51A and 51B. The outer and inner flat plate portions 51A and 51B extend in the Z-axis direction. An inner side surface (surface on the optical axis OA side) of the outer flat plate portion 51A is an installation surface 51D, and the first magnet 45 is fixed to the installation surface 51D. The first magnet 45 is fixed to the installation surface 51D by, for example, adhesion with an adhesive. The installation surface 51D extends in the Z-axis direction. The first yokes 47A and 47B are attached to the inside of the lens barrel body 21 by, for example, screwing, adhesion with an adhesive, or press-fitting.

In the first magnet 45, an N pole is magnetized on the outer flat plate portion 51A side of the first yoke 47A, and an S pole is magnetized on the inner flat plate portion 51B side on the opposite side. The first magnet 45 is selected from, for example, a ferrite magnet, an alnico magnet, a samarium cobalt magnet, or a neodymium magnet.

In the first yoke 47A, the folded-back portion 51C is located on the distal end side, and an open end 51E is located on the base end side. The open end 51E is formed with a recess portion 51F (see FIG. 7) that is recessed from an end surface to the distal end side. The open end 51E and the recess portion 51F correspond to division portions within the scope of the claims.

On the other hand, the first yoke 47B is located on the base end side (image plane side) in the Z-axis direction with respect to the first yoke 47A. The first yoke 47B has an outer flat plate portion 52A, an inner flat plate portion 52B, and a folded-back portion 52C connecting the flat plate portions 52A and 52B. The outer and inner flat plate portions 52A and 52B extend in the Z-axis direction. An inner side surface (surface on the optical axis OA side) of the outer flat plate portion 52A is an installation surface 52D, and the second magnet 46 is fixed to the installation surface 52D. The second magnet 46 is fixed to the installation surface 52D by, for example, adhesion with an adhesive. The installation surface 52D extends in the Z-axis direction.

In the second magnet 46, an S pole is magnetized on the outer flat plate portion 52A side of the first yoke 47B, and an N pole is magnetized on the inner flat plate portion 52B side on the opposite side. The second magnet 46 is selected from, for example, a ferrite magnet, an alnico magnet, a samarium cobalt magnet, or a neodymium magnet.

In the first yoke 47B, the folded-back portion 52C is located on the distal end side, and an open end 52E is located on the base end side. A protruding portion 52F (see FIG. 7) that protrudes from the end surface to the distal end side is formed on the open end 52E. The open end 52E and the protruding portion 52F correspond to division portions within the scope of the claims.

The second yoke 48 is disposed along an X-axis direction (tangential direction of the circle about the optical axis OA) and a Y-axis direction (radial direction intersecting the Z-axis direction and the X-axis direction). The second yoke 48 is formed with protruding portions 48A and 48B that protrude from the inner and outer end surfaces in the Y-axis direction and recess portions 48C and 48D that are recessed from the center of the protruding portions 48A and 48B.

In the second yoke 48, the protruding portions 48A and 48B are fitted into the recess portion 51F of the first yoke 47A, and the recess portions 48C and 48D are fitted into the protruding portion 52F of the first yoke 47B. As a result, the first yokes 47A and 47B and the second yoke 48 are bonded to each other. It should be noted that, regarding the bonding between the first yokes 47A and 47B and the second yoke 48, the first yokes 47A and 47B and the second yoke 48 may be bonded to each other by only fitting between the protruding portions 48A and 48B and the recess portion 51F and fitting between the recess portions 48C and 48D and the protruding portion 52F, or may be bonded by a combination of these fittings and adhesion with an adhesive.

In the present invention, a thickness dimension $t_5$ of the second yoke 48 is formed to be larger (thicker) than thickness dimensions $t_1$ to $t_4$ of the first yoke 47. It should be noted that reference numeral $t_1$ is the thickness dimensions of the outer flat plate portions 51A and 52A, reference numeral $t_2$ is the thickness dimensions of the inner flat plate portions 51B and 52B, reference numeral $t_3$ is the thickness dimension of the folded-back portion 52C, and reference numeral $t_4$ is the thickness dimension of the folded-back portion 51C.

Figure 9:
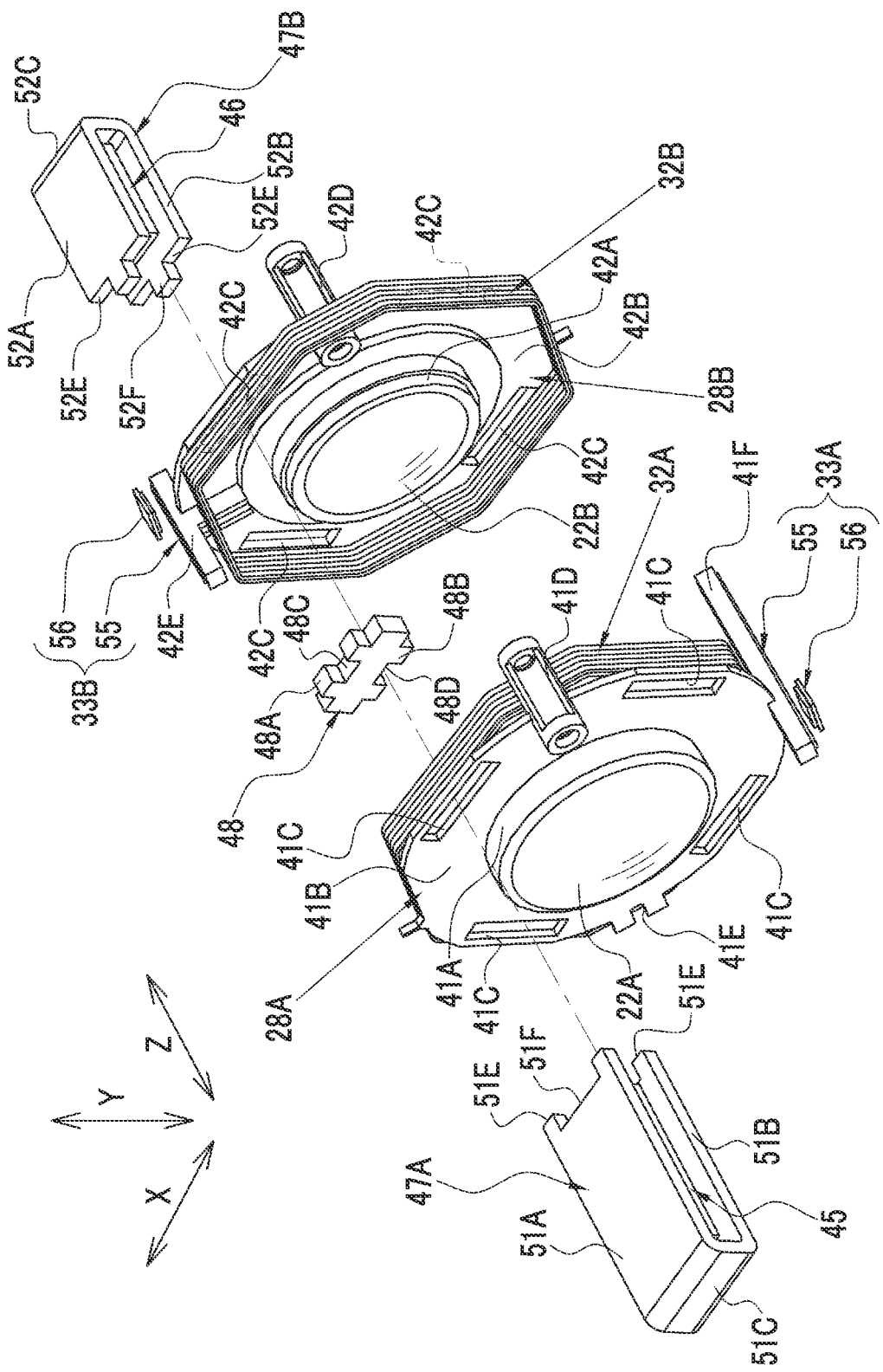
FIG. 9 is a perspective view showing a step in which the first yokes are inserted into through-holes of the first holding member and the second holding member, respectively, and the first yokes are bonded to each other with the second yoke interposed therebetween.

As shown in FIG. 9, in the first yoke 47A, the inner flat plate portion 51B is inserted into the through-hole 41C of the first holding member 28A. As described above, since the first coil 32A is fixed at a position outside the through-hole 41C, the first coil 32A is located inside the first yoke 47A inserted into the through-hole 41C, and specifically, is disposed at a position corresponding to the first magnet 45.

On the other hand, in the first yoke 47B, the inner flat plate portion 52B is inserted into the through-hole 42C of the second holding member 28B. As described above, since the second coil 32B is fixed at a position outside the through-hole 42C, the second coil 32B is located inside the first yoke 47B inserted into the through-hole 41C, and specifically, is disposed at a position corresponding to the second magnet 46.

It should be noted that, although FIG. 9 shows a state in which the first yokes 47A and 47B are inserted into one through-hole 41C and one through-hole 42C, respectively, and the first yokes 47A and 47B are bonded to each other with the second yoke 48 interposed therebetween, in fact, the first yokes 47A and 47B are inserted into the remaining three through-holes 41C and three through-holes 42C, respectively, and the first yokes 47A and 47B are bonded to each other with the second yoke 48 interposed therebetween. That is, the four magnetic circuit units 31A to 31D are disposed around the first zoom lens 22A, the first coil 32A, the second zoom lens 22B, and the second coil 32B, and a part of the first coil 32A and a part of the second coil 32B are disposed inside the magnetic circuit units 31A to 31D.

The first magnet 45 and the second magnets 46, which are fixed to the first yokes 47A and 47B, respectively, by bonding between the first yokes 47A and 47B and the second yokes 48, are disposed along the Z-axis direction. Then, in the first yoke 47, the open end 51E, the recess portion 51F, the open end 52E, and the protruding portion 52F, that is, the division portions are located at positions between the first magnet 45 and the second magnet 46 in the Z-axis direction. The second yoke 48 is provided in the division portion. Specifically, the second yoke 48 is interposed between the first yokes 47A and 47B that are divided at the positions of the open end 51E, the recess portion 51F, the open end 52E, and the protruding portion 52F. As a result, the second yoke 48 is disposed between the first magnet 45 and the second magnet 46.

As described above, by bonding between the first yokes 47A and 47B and the second yoke 48 and disposing a part of the first coil 32A and a part of the second coil 32B inside the magnetic circuit unit 31, the first coil 32A is disposed in the magnetic field of the first magnet 45, and the second coil 32B is disposed in the magnetic field of the second magnet 46.

Figure 10:
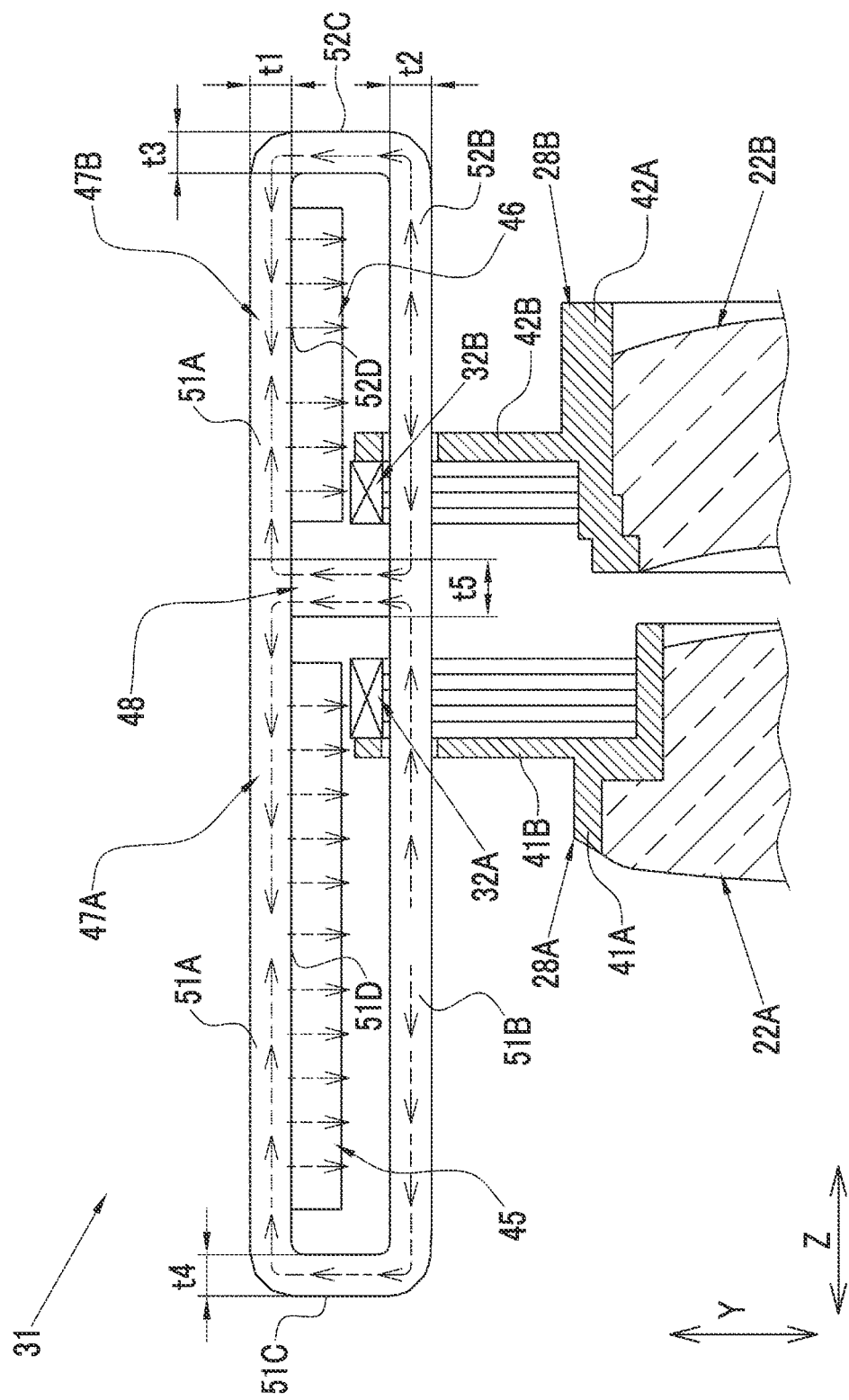
FIG. 10 is an explanatory diagram schematically showing a flow of magnetic fluxes from the first magnet and the second magnet.

As shown in FIG. 10, the first coil 32A is disposed inside the magnetic circuit consisting of the first magnet 45, the first yoke 47A, and the second yoke 48. Therefore, in a case in which the VCM driver 62 energizes the first coil 32A by the control of the lens controller 61 and an electromagnetic force is generated in the first coil 32A, the first coil 32A located in the magnetic field of the first magnet 45 is moved in the optical axis direction along the inner flat plate portion 51B. As a result, the first holding member 28A and the first zoom lens 22A, which are provided integrally with the first coil 32A, can be moved in the Z-axis direction.

On the other hand, the second coil 32B is disposed inside the magnetic circuit consisting of the second magnet 46, the first yoke 47B, and the second yoke 48. Therefore, in a case in which the VCM driver 62 energizes the second coil 32B by the control of the lens controller 61 and an electromagnetic force is generated in the second coil 32B, the second coil 32B located in the magnetic field of the second magnet 46 is moved in the Z-axis direction along the inner flat plate portion 52B. As a result, the second holding member 28B and the second zoom lens 22B, which are provided integrally with the second coil 32B, can be moved in the Z-axis direction.

In a case in which the first coil 32A and the second coil 32B are energized, the electromagnetic force is generated by the magnetic field and the current (so-called Fleming's left-hand rule). By matching the direction in which the electromagnetic force is generated with the optical axis OA, the first coil 32A and the second coil 32B are driven in the Z-axis direction using the electromagnetic force as a thrust.

As described above, the second yoke 48 serves as the magnetic circuit (composed of the first yoke 47A and the second yoke 48) for moving the first coil 32A and the magnetic circuit (composed of the first yoke 47B and the second yoke 48) for moving the second coil 32B. As a result, in the second yoke 48, the magnetic flux from the first magnet 45 (indicated by a broken arrow in FIG. 10) and the magnetic flux from the second magnet 46 (indicated by a double-dot chain arrow in FIG. 10) are concentrated.

In the related art, in the VCM, all the yokes are formed of a material having a regular thickness. Therefore, in a case in which the thickness dimension of the second yoke 48 is the same dimension as the thickness dimension of the first yoke 47, in a case in which the magnetic flux from the first magnet 45 and the magnetic flux from the second magnet 46 are concentrated, a magnetic flux density in the second yoke 48 is increased, and the saturated magnetic flux leaks to the outside of the second yoke 48. That is, the magnetic fluxes of the first magnet 45 and the second magnet 46 cannot be used as the thrust of the first coil 32A and the second coil 32B without waste.

However, in the present invention, since the thickness dimension t5 of the second yoke 48 is formed to be larger than the thickness dimensions t1 to t4 of the first yoke 47, it is possible to suppress an increase in the magnetic flux density of the second yoke 48 in which the magnetic fluxes of the first magnet 45 and the second magnet 46 are concentrated, and thus it is possible to prevent the magnetic flux from being saturated. That is, the magnetic fluxes of the first magnet 45 and the second magnet 46 can be efficiently used as the thrust of the first coil 32A and the second coil 32B.

For example, at least one of the first zoom lens 22A or the second zoom lens 22B has a weight equal to or more than 20 g and a dimension equal to or more than 15 mm in the Z-axis direction (optical axis direction). As described above, since the first zoom lens 22A and the second zoom lens 22B, which are relatively heavy and have large dimensions, are moved by the VCM, for the dimensions of the first magnet 45 and the second magnet 46, the dimension of each portion is determined such that the thrust (electromagnetic force) is efficiently generated.

Figure 11:
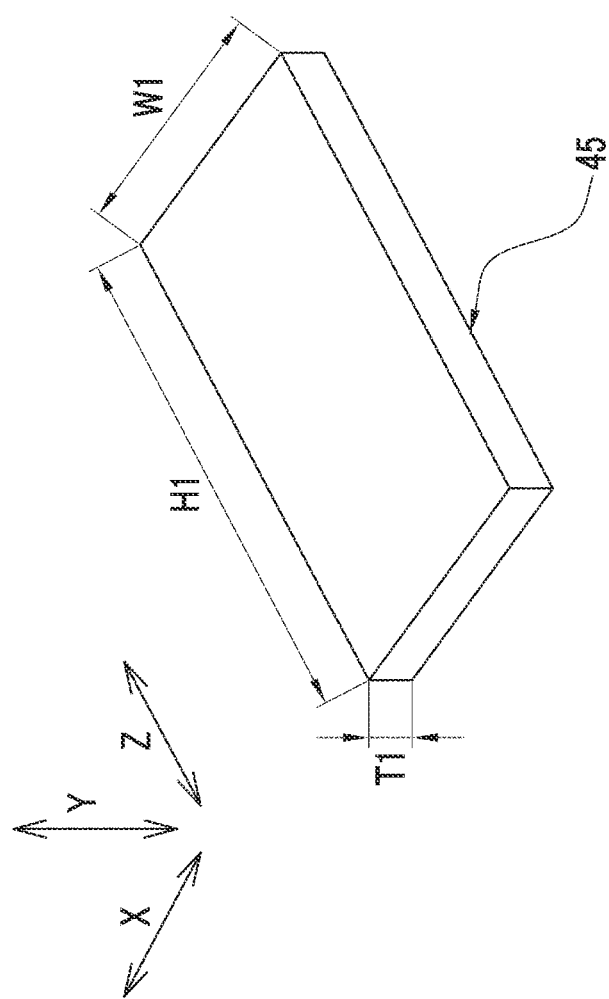
FIG. 11 is an explanatory diagram showing dimensions of the first magnet.

As shown in FIG. 11, in a case in which the dimension of the first magnet 45 in the Z-axis direction is a length dimension H1, the dimension in the X-axis direction is a width dimension W1, the dimension in the Y-axis direction is a thickness dimension T1, and a force generated by energizing the first coil 32A is a thrust F1 (thrust for the first magnet 45 per piece), it is preferable to set the width dimension W1 in which a thrust change amount dF1/dW1, which is a ratio of an increase amount dF1 of the thrust F1 to an increase amount dW1 of the width dimension W1, is a large value.

Figure 12:
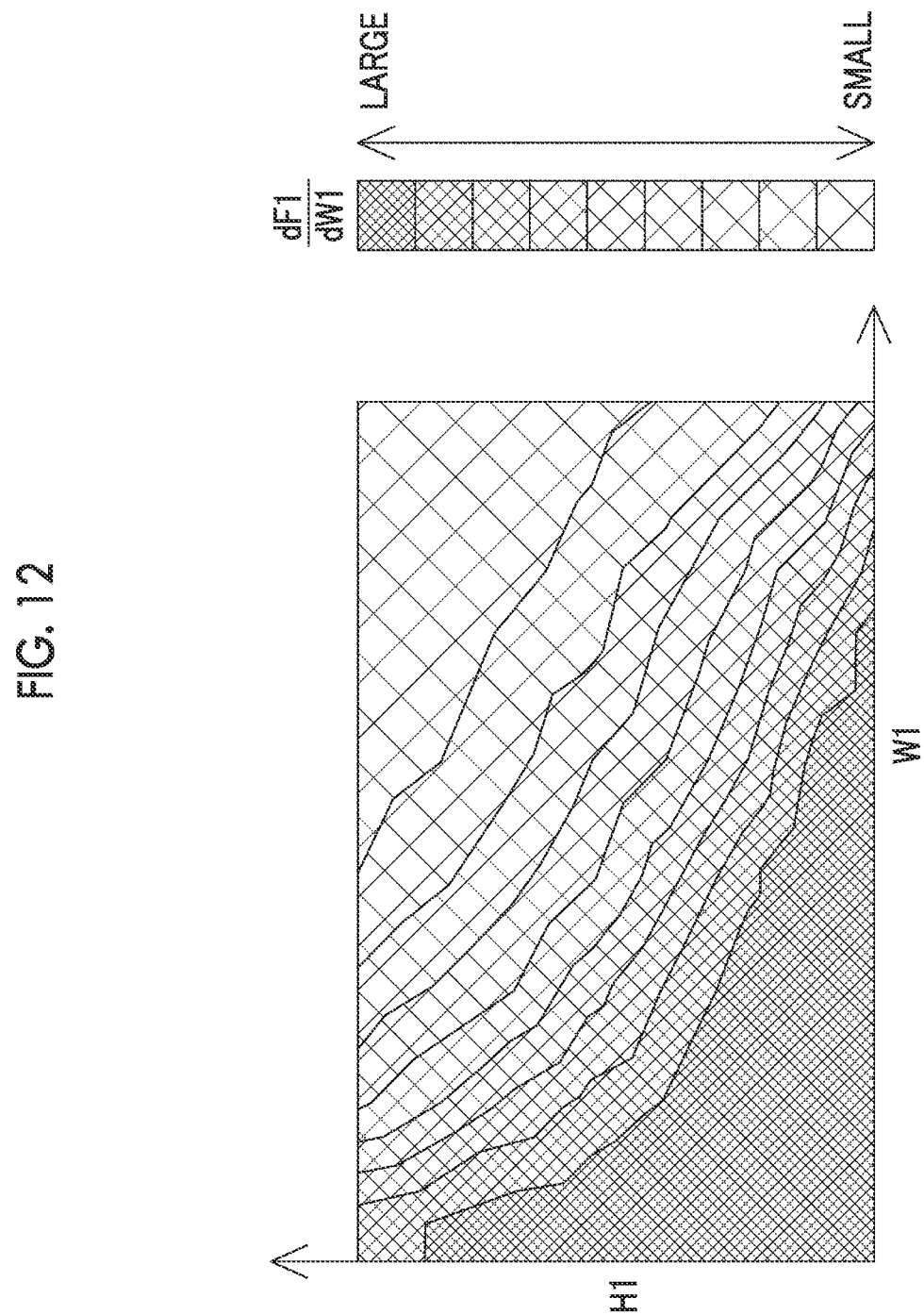
FIG. 12 is a graph showing a relationship between a thrust change amount with respect to a length dimension and a width dimension of the first magnet.

FIG. 12 is a graph showing a relationship between the thrust change amount dF1/dW1 with respect to the length dimension H1 and the width dimension W1 of the first magnet 45. It should be noted that the thickness dimension T1 of the first magnet 45 is fixed regardless of the length dimension H1 and the width dimension W1. FIG. 12 shows that the thrust change amount dF1/dW1 is larger as the hatching mesh is smaller, and the thrust change amount dF1/dW1 is smaller as the hatching mesh is larger.

The length dimension H1 of the first magnet 45 is determined by the movement amount of the first coil 32A, that is, the first zoom lens 22A, and the thickness dimension T1 is determined by a space inside the lens barrel 12. As a result, in order to efficiently generate the thrust for moving the first zoom lens 22A, it is preferable to set the width dimension W1 in which the thrust is efficiently generated with respect to the length dimension H1 and thickness dimension T1 which are already determined (have fixed values). That is, in FIG. 12, in a case in which the length dimension H1 and the thickness dimension T1 are fixed values, it is preferable to select the width dimension W1 from a region in which the thrust change amount dF1/dW1 is large (region in which the hatching mesh is small). Further, a threshold value is set for the thrust change amount dF1/dW1, and in a case in which the length dimension H1 and the thickness dimension T1 are fixed values, it is preferable to set the width dimension W1 to the dimension in which the thrust change amount dF1/dW1 is equal to or more than the threshold value.

It should be noted that, in a case in which the dimensions of the second magnet 46 are determined, the dimensions of the second magnet 46 are also set in the same manner as in a case of the first magnet 45. That is, in a case in which the dimension of the second magnet 46 in the Z-axis direction is a length dimension H2, the dimension in the X-axis direction is a width dimension W2, the dimension in the Y-axis direction is a thickness dimension T2, and a force generated by energizing the first coil 32A is a thrust F2 (thrust for the second magnet 46 per piece), in a case in which the length dimension H2 and the thickness dimension T2 are fixed values, it is preferable to select the width dimension W2 from a region in which a thrust change amount dF2/dW2, which is a ratio of an increase amount dF2 of the thrust F2 to an increase amount dW2 of the width dimension W2, is large (region in which the hatching mesh is small). Further, a threshold value is set for the thrust change amount dF2/dW2, and in a case in which the length dimension H2 and the thickness dimension T2 are fixed values, it is preferable to set the width dimension W2 to the dimension in which the thrust change amount dF2/dW2 is equal to or more than the threshold value.

As described above, it is preferable that the first magnet 45 and the second magnet 46 have the width dimensions W1 and W2 in which the thrust change amounts dF1/dW1 and dF2/dW2 are equal to or more than the threshold value, and a plurality of the magnetic circuit units 31 including the first magnet 45 and the second magnet 46 be disposed in a circumferential direction of the circle about the optical axis OA, respectively. As a result, since a plurality of first magnets 45 and a plurality of second magnets 46 having the dimensions for efficiently obtaining the thrust are disposed, the thrust of the first coil 32A and the second coil 32B are also increased in accordance with an increase in the number of the first magnets 45 and the second magnets 46. In the present embodiment, the four magnetic circuit units 31A to 31D are disposed in the circumferential direction about the optical axis OA.

Moreover, as described above, the first holding member 28A holds the first zoom lens 22A and the first coil 32A, and the second holding member 28B holds the second zoom lens 22B and the second coil 32B. The first coil 32A and the second coil 32B are disposed at positions facing each other with the second yoke 48 interposed therebetween. As shown in FIG. 10, the first holding member 28A has the flange portion 41B (first holding portion) that holds the first coil 32A at a position opposite to the second yoke 48 with respect to the first coil 32A, and the second holding member 28B has the flange portion 42B (second holding portion) that holds the second coil 32B at a position opposite to the second yoke 48 with respect to the second coil 32B. As a result, in a case in which an angle of view of the imaging optical system 22 is magnified, the first holding member 28A and the second holding member 28B do not interfere with each other, the first coil 32A and the second coil 32B can be disposed at closer positions, and thus a degree of freedom in design is improved.

Figure 13:
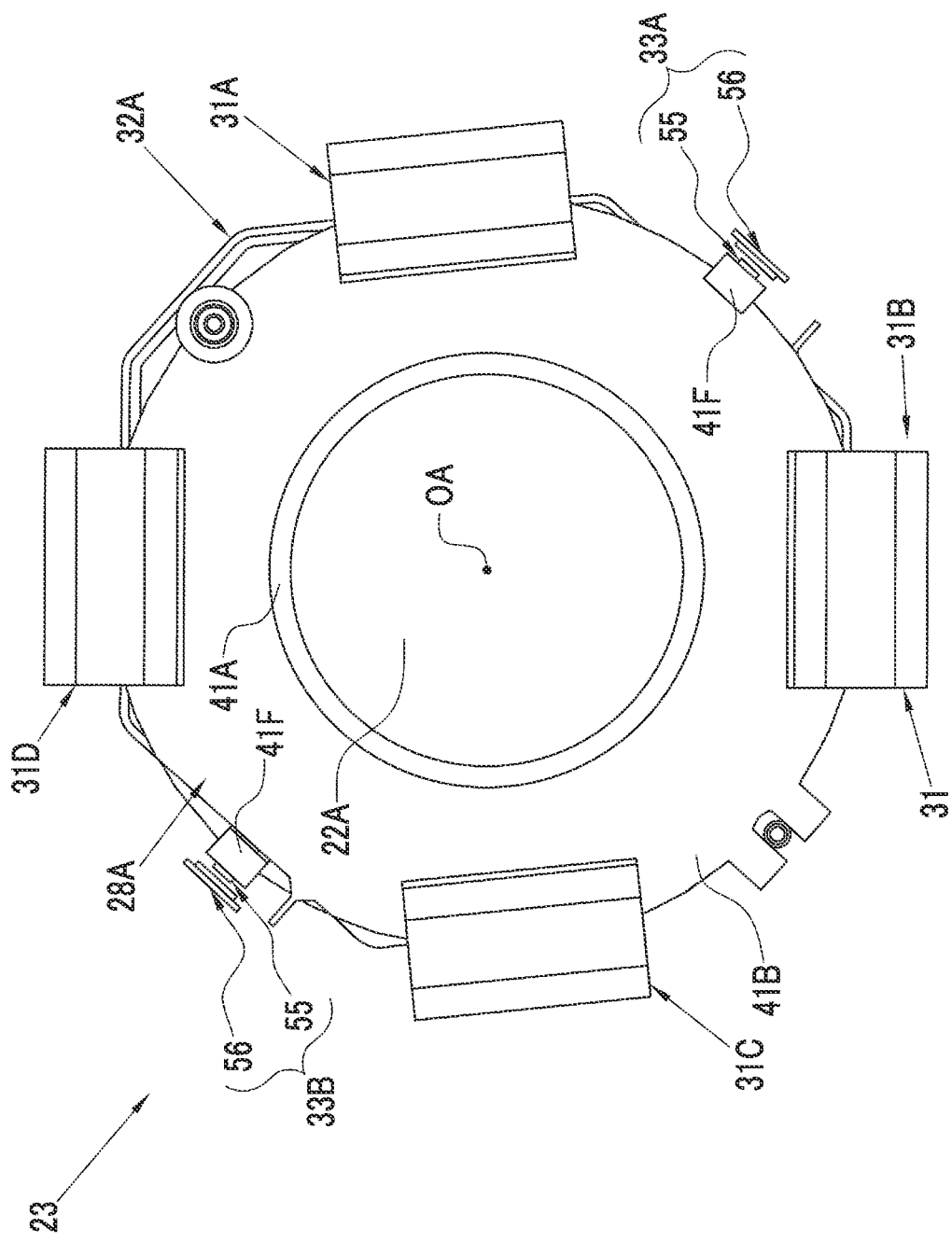
FIG. 13 is a front view of the drive device.

As shown in FIG. 13, the magnetic circuit units 31 are disposed in pairs at positions facing each other with the optical axis OA interposed therebetween. That is, the magnetic circuit unit 31A and the magnetic circuit unit 31C are disposed in pairs at positions facing each other with the optical axis OA interposed therebetween and the magnetic circuit unit 31B and the magnetic circuit unit 31D are disposed in pairs at positions facing each other with the optical axis OA interposed therebetween.

The first position detection sensor 33A is located between the magnetic circuit unit 31A and the magnetic circuit unit 31B. The first position detection sensor 33A detects a position of the first holding member 28A, that is, the first zoom lens 22A. The first position detection sensor 33A is composed of the position detection magnet 55 and a magnetic sensor 56. For example, a multi-pole magnetizing magnet is used as the position detection magnet 55, and a magnetoresistive sensor (MR sensor) is used as the magnetic sensor 56.

The position detection magnet 55 is attached to the sensor holding portion 41F of the first holding member 28A (see FIG. 9). The magnetic sensor 56 is attached to the lens barrel body 21 to face the position detection magnet 55 (see FIG. 8). The position detection magnet 55 is magnetized in a pattern in which N poles and S poles are alternately arranged along the Z-axis direction. A pattern width of the magnetization is, for example, about 100 μm. The magnetic sensor 56 is configured by using, for example, various magnetic resistance (MR) elements of which an electric resistance value is changed in accordance with strength of the magnetic field.

The magnetic sensor 56 outputs a pulse signal corresponding to the pattern of the position detection magnet 55 in which the N poles and the S poles are alternately arranged or an electric signal that is changed periodically to the lens controller 61. Based on this output, the lens controller 61 can detect the position of the first holding member 28A, that is, the first zoom lens 22A. It should be noted that the first position detection sensor 33A is not limited to this, and may include, for example, a hall sensor formed of a hall element and a magnet.

On the other hand, the second position detection sensor 33B is located between the magnetic circuit unit 31C and the magnetic circuit unit 31D, and detects a position of the second zoom lens 22B. As described above, the first position detection sensor 33A and the second position detection sensor 33B have different positions in the circumferential direction about the optical axis OA. As a result, the first position detection sensor 33A and the second position detection sensor do not interfere with each other, and a space inside the lens barrel body 21 can be effectively used to efficiently dispose the component.

The second position detection sensor 33B is composed of the position detection magnet 55 and the magnetic sensor 56, similarly to the first position detection sensor 33A. The position detection magnet 55 is attached to the sensor holding portion 42F of the second holding member 28B (see FIG. 9). Similarly to a case of the first position detection sensor 33A, in the second position detection sensor 33B, the magnetic sensor 56 outputs a pulse signal corresponding to the pattern of the position detection magnet 55 in which the N poles and the S poles are alternately arranged or an electric signal that is changed periodically to the lens controller 61. Based on this output, the lens controller 61 can detect the position of the second holding member 28B, that is, the second zoom lens 22B. It should be noted that the second position detection sensor 33B is not limited to this, and may include, for example, a hall sensor formed of a hall element and a magnet.

Figure 14:
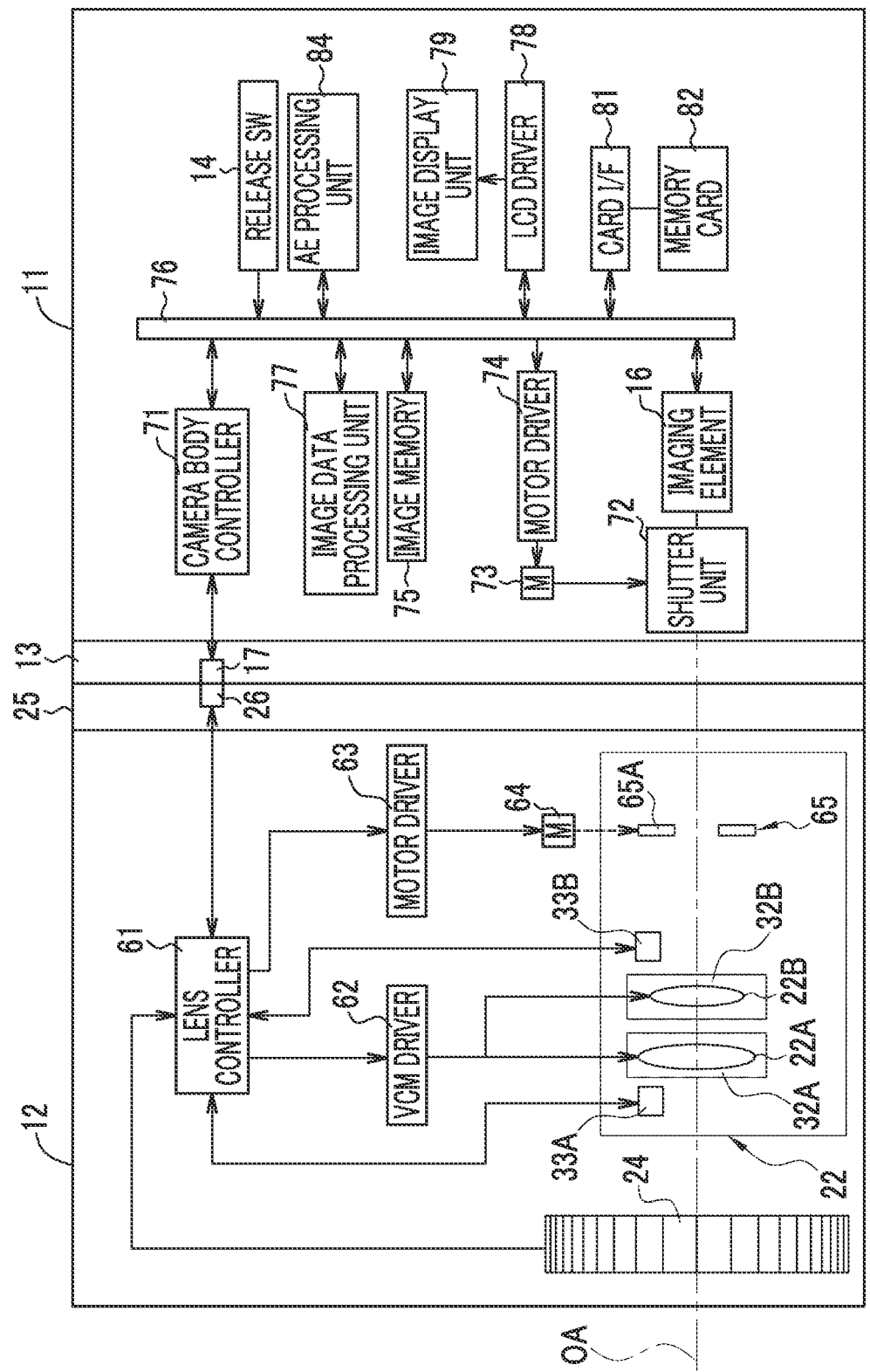
FIG. 14 is a block diagram showing a schematic configuration of the digital camera.

As shown in FIG. 14, the lens barrel 12 comprises a motor driver 63, a motor 64, and the like in addition to the imaging optical system 22, the first coil 32A, the second coil 32B, the first position detection sensor 33A, the second position detection sensor 33B, the lens controller 61, and the VCM driver 62.

The lens controller 61 consists of a microcomputer comprising a central processing unit (CPU), a read only memory (ROM) that stores programs or parameters used in the CPU, a random access memory (RAM) used as a work memory of the CPU (none of which is shown), and controls each unit of the lens barrel 12. The VCM driver 62, the motor driver 63, the first position detection sensor 33A, and the second position detection sensor 33B are connected to the lens controller 61.

The lens controller 61 controls driving of a stop unit 65, the first zoom lens 22A, and the second zoom lens 22B based on a control signal from a camera body controller 71 described below. The lens controller 61 detects a rotational position of the zoom ring 24 by a sensor (not shown), and moves the first zoom lens 22A and the second zoom lens 22B in accordance with information on a rotation direction and a rotation amount. It should be noted that the lens controller 61 may move the first zoom lens 22A and the second zoom lens 22B in response to the control signal on the camera body 11 side.

The imaging optical system 22 comprises a plurality of lenses including the first zoom lens 22A and the second zoom lens 22B, the stop unit 65, and the like. The first zoom lens 22A and the second zoom lens 22B are moved in the Z-axis direction by energizing the first coil 32A and the second coil 32B to magnify the angle of view of the imaging optical system 22. The lens controller 61 transmits a control signal for moving the first zoom lens 22A and the second zoom lens 22B to the VCM driver 62 in accordance with the information on the rotation direction and the rotation amount of the zoom ring 24 or in response to the control signal on the camera body 11 side. The VCM driver 62 energizes the first coil 32A and the second coil 32B based on the control signal.

The stop unit 65 moves a plurality of stop leaf blades 65A by driving of the motor 64 to change an amount of light incident on the imaging element 16. The motor driver 63 controls the driving of the motor 64 based on the control of the lens controller 61.

The camera body controller 71 comprises a CPU, a ROM that stores programs or parameters used in the CPU, and a RAM used as a work memory of the CPU (none of which is shown). The camera body controller 71 controls the camera body 11 and each unit of the lens barrel 12 connected to the camera body 11. A release signal is input to the camera body controller 71 from the release switch 14. Moreover, the body-side signal contact 17 is connected to the camera body controller 71.

The lens-side signal contact 26 comes into contact with the body-side signal contact 17 in a case in which the lens mount 25 of the lens barrel 12 is mounted on the lens mount 13 of the camera body 11, and the lens barrel 12 and the camera body 11 are electrically connected to each other.

A shutter unit 72 is a so-called focal plane shutter, and is disposed between the lens mount 13 and the imaging element 16. The shutter unit 72 is provided to be able to block an optical path between the imaging optical system 22 and the imaging element 16, and is changed between an opened state and a closed state. The shutter unit 72 is put into the opened state in a case of capturing a live view image and a video. In a case of capturing a still image, the shutter unit 72 is temporarily put into the closed state from the opened state. The shutter unit 72 is driven by a shutter motor 73. A motor driver 74 controls the driving of the shutter motor 73.

The imaging element 16 is driven and controlled by the camera body controller 71. The imaging element 16 has a light-receiving surface configured by a plurality of pixels (not shown) arranged in a two-dimensional matrix. Each pixel includes a photoelectric conversion element, and performs photoelectric conversion of a subject image imaged on the light-receiving surface by the imaging optical system 22 to generate an imaging signal.

Moreover, the imaging element 16 comprises a signal processing circuit (none of which is shown), such as a noise removal circuit, an auto gain controller, and an A/D conversion circuit. The noise removal circuit performs noise removal processing on the imaging signal. The auto gain controller amplifies a level of the imaging signal to an optimum value. The A/D conversion circuit converts the imaging signal into a digital signal and outputs the converted signal from the imaging element 16 to a busline 76. The output signal of the imaging element 16 is image data (so-called RAW data) having one color signal for each pixel.

An image memory 75 stores image data for one frame output to the busline 76. An image data processing unit 77 reads out the image data for one frame from the image memory 75 and performs known image processing, such as matrix operation, demosaicing processing, γ correction, brightness/color difference conversion, and resizing processing.

An LCD driver 78 sequentially inputs the image data for one frame subjected to the image processing by the image data processing unit 77 to an image display unit 79. The image display unit 79 is provided, for example, on a rear surface of the camera body 11 and sequentially displays the live view images at regular intervals. A card interface (I/F) 81 is incorporated in a card slot (not shown) provided in the camera body 11 and is electrically connected to a memory card 82 inserted in the card slot. The card I/F 81 stores the image data subjected to the image processing by the image data processing unit 77 in the memory card 82. Moreover, in a case in which the image data stored in the memory card 82 is reproduced and displayed, the card I/F 81 reads out the image data from the memory card 82.

The camera body controller 71 operates the stop unit 65 in accordance with exposure information calculated by an automatic exposure (AE) processing unit 84 described below, and transmits a control signal for changing a stop diameter to the lens controller 61. The lens controller 61 controls the motor driver 74 based on the control signal, and controls the stop diameter of the stop unit 65 to obtain a stop value calculated by the AE processing unit 84.

The AE processing unit 84 calculates an integrated value of each color signal from the image data for one frame. The camera body controller 71 calculates an appropriate exposure value based on the integrated value calculated for each image for one frame, and decides the stop value to be an appropriate exposure value calculated with respect to a preset shutter speed. The camera body controller 71 transmits the control signal to the lens controller 61. The lens controller 61 controls the motor driver 63 based on the control signal, and operates the stop unit 65 at the stop diameter at which the decided stop value is obtained.

The operation of the lens barrel 12 according to the present embodiment will be described. In a case in which the lens barrel 12 is attached to the camera body 11 and the power switch (not shown) is operated by a user who is an imager, the power is supplied to each unit of the digital camera 10.

In a state in which the power of the digital camera 10 is turned on, the imaging element 16, the camera body controller 71, the lens controller 61, and the like are activated. As described above, in a case in which the control signal is received in accordance with the information on the rotation direction and the rotation amount of the zoom ring 24 or from the camera body controller 71, the lens controller 61 moves the first zoom lens 22A and the second zoom lens 22B.

The operation of moving the first zoom lens 22A and the second zoom lens 22B in the Z-axis direction by energizing the first coil 32A and the second coil 32B will be described with reference to FIGS. 15 and 16. It should be noted that, in the examples shown in FIGS. 15 and 16, the first zoom lens 22A and the second zoom lens 22B constituting the imaging optical system 22 having a four-group configuration are shown. That is, the imaging optical system 22 has a configuration of an optical system 22C of a first group, the first zoom lens 22A, the second zoom lens 22B, and an optical system 22D of a fourth group in order from the subject side, and the first zoom lens 22A and the second zoom lens 22B correspond to optical systems of a second group and a third group. Moreover, the optical system 22C of the first group and the optical system 22D of the fourth group are optical systems which have positions restricted with respect to the lens barrel body 21 and are not moved in the Z-axis direction. It should be noted that the optical system including the zoom lens described in the present embodiment is an example, and the technology of the present disclosure can be applied to an optical system including a focus lens or the like.

Figure 15:
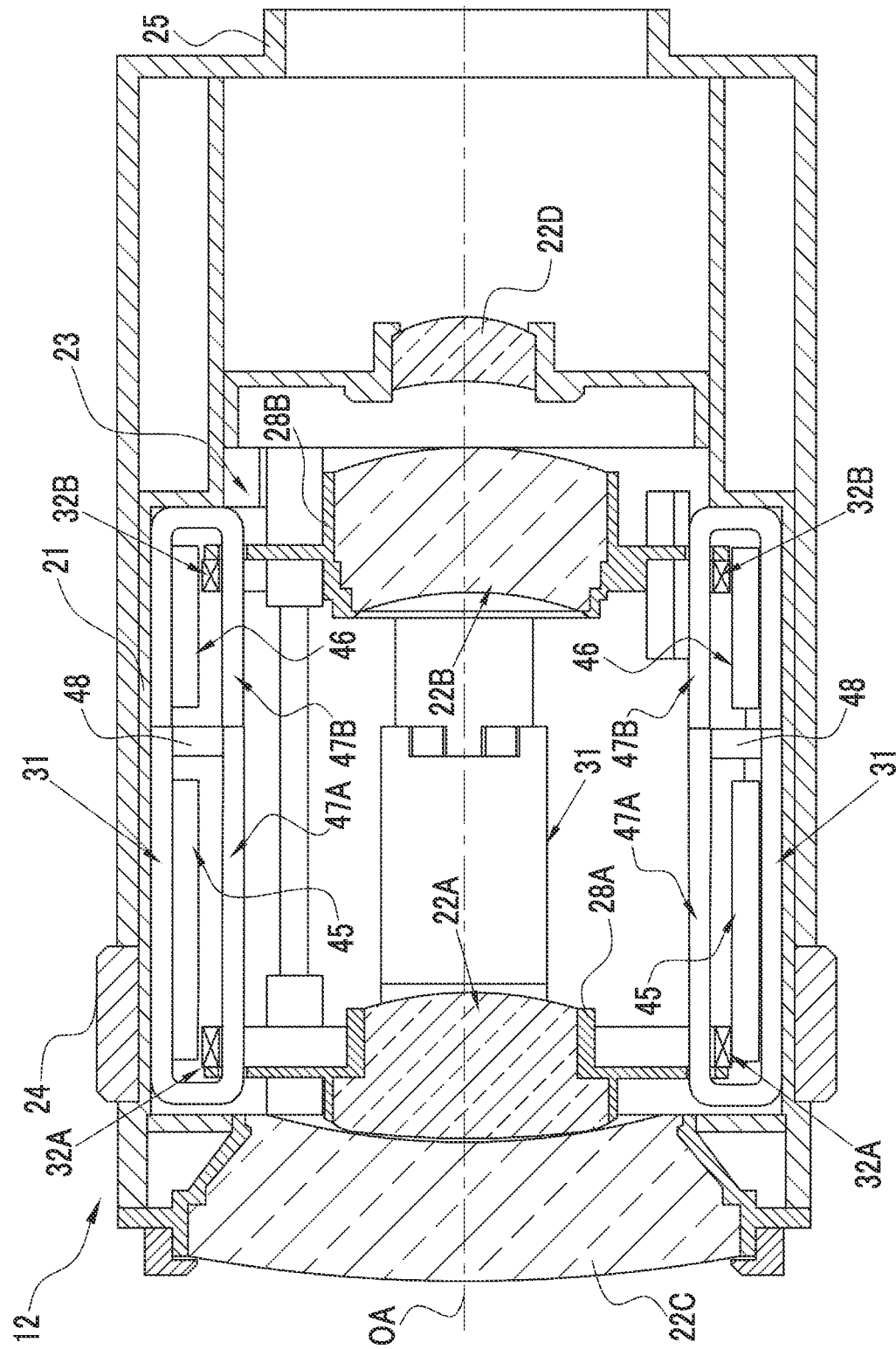
FIG. 15 is a cross-sectional view of a main part of the lens barrel in a state in which an imaging optical system is located on a wide angle side.

As shown in FIG. 15, in a state in which the imaging optical system 22 of the lens barrel 12 is located on a wide angle side, the first zoom lens 22A and the second zoom lens 22B are located at positions spaced from each other. On the other hand, as shown in FIG. 16, in a state in which the imaging optical system 22 of the lens barrel 12 is located on a telephoto side, the first zoom lens 22A and the second zoom lens 22B are at positions close to each other.

Figure 16:
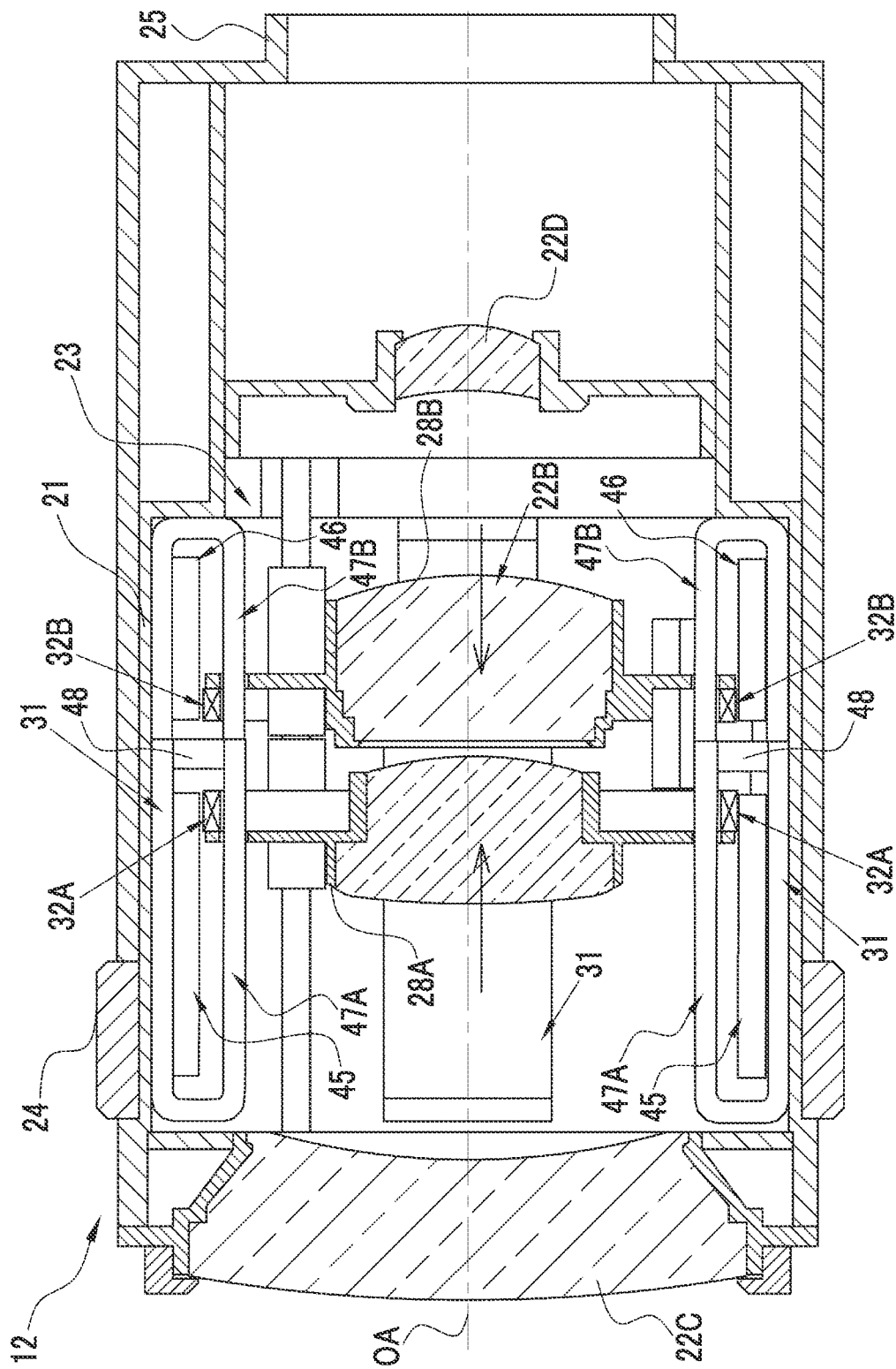
FIG. 16 is a cross-sectional view of a main part of the lens barrel in a state in which the imaging optical system is located on a telephoto side.

In a case in which the angle of view of the imaging optical system 22 is magnified from the wide angle side shown in FIG. 15 to the telephoto side shown in FIG. 16, the first coil 32A and the second coil 32B are energized and the directions of the currents flowing through the first coil 32A and the second coil 32B are set to opposite directions. As a result, the first coil 32A located in the magnetic field of the first magnet 45 is moved to the base end side in the Z-axis direction, and the second coil 32B located in the magnetic field of the second magnet 46 is moved to the distal end side in the Z-axis direction. That is, the first holding member 28A and the first zoom lens 22A provided integrally with the first coil 32A are moved to the base end side, and the second holding member 28B and the second zoom lens 22B provided integrally with the second coil 32B are moved to the distal end side.

In a case in which the first holding member 28A and the first zoom lens 22A are moved to the base end side and the second holding member 28B and the second zoom lens 22B are moved to the distal end side by energizing the first coil 32A and the second coil 32B, as shown in FIG. 16, the imaging optical system 22 is located on the telephoto side, that is, the first zoom lens 22A and the second zoom lens 22B are located positions close to each other.

On the other hand, in a case in which the angle of view of the imaging optical system 22 is magnified from the telephoto side shown in FIG. 16 to the wide angle side shown in FIG. 15, the directions of the currents flowing through the first coil 32A and the second coil 32B need only be reversed from the case described above. As a result, the first holding member 28A and the first zoom lens 22A provided integrally with the first coil 32A are moved to the distal end side, and the second holding member 28B and the second zoom lens 22B provided integrally with the second coil 32B are moved to the base end side. That is, the first zoom lens 22A and the second zoom lens 22B are located at positions spaced from each other.

As described above, in the drive device 23, the first yoke 47 that holds the first magnet 45 and the second magnet 46, and the common second yoke 48 disposed between the first magnet 45 and the second magnet 46 are provided, so that it is possible to efficiently obtain the thrust in a case in which the first coil 32A and the second coil 32B are driven, and it is possible to reduce the weight and the size of the drive device 23, by extension, the lens barrel 12. In regards to this, in the drive device in the related art, the first coil and the second coil are driven by using the magnetic circuits consisting of only separate components for the first coil and the second coil, but in the present invention, the first coil 32A and the second coil 32B are driven by using common components, such as the first yoke 47 and the second yoke 48. As a result, it is possible to reduce the weight and the size as much as the common components are used. Further, since the thickness dimension t5 of the second yoke 48 is formed to be larger than the thickness dimensions t1 to t4 of the first yoke 47, as described above, it is possible to prevent the magnetic flux from being saturated. As a result, the magnetic fluxes of the first magnet 45 and the second magnet 46 can be efficiently used as the thrust of the first coil 32A and the second coil 32B. That is, it is not necessary to use the magnet and the yoke that are larger than necessary, and the drive device 23, by extension, the lens barrel 12 can be further reduced in weight and size.

Second Embodiment

In the first embodiment, the first yoke 47 has the division portion at the position between the first magnet 45 and the second magnet 46 in the optical axis direction, and the second yoke 48 is provided in the division portion, but the present invention is not limited to this. In the second embodiment described below, a configuration will be described in which a groove portion is provided on a side surface of the first yoke and the second yoke 48 is disposed in the groove portion.

Figure 17:
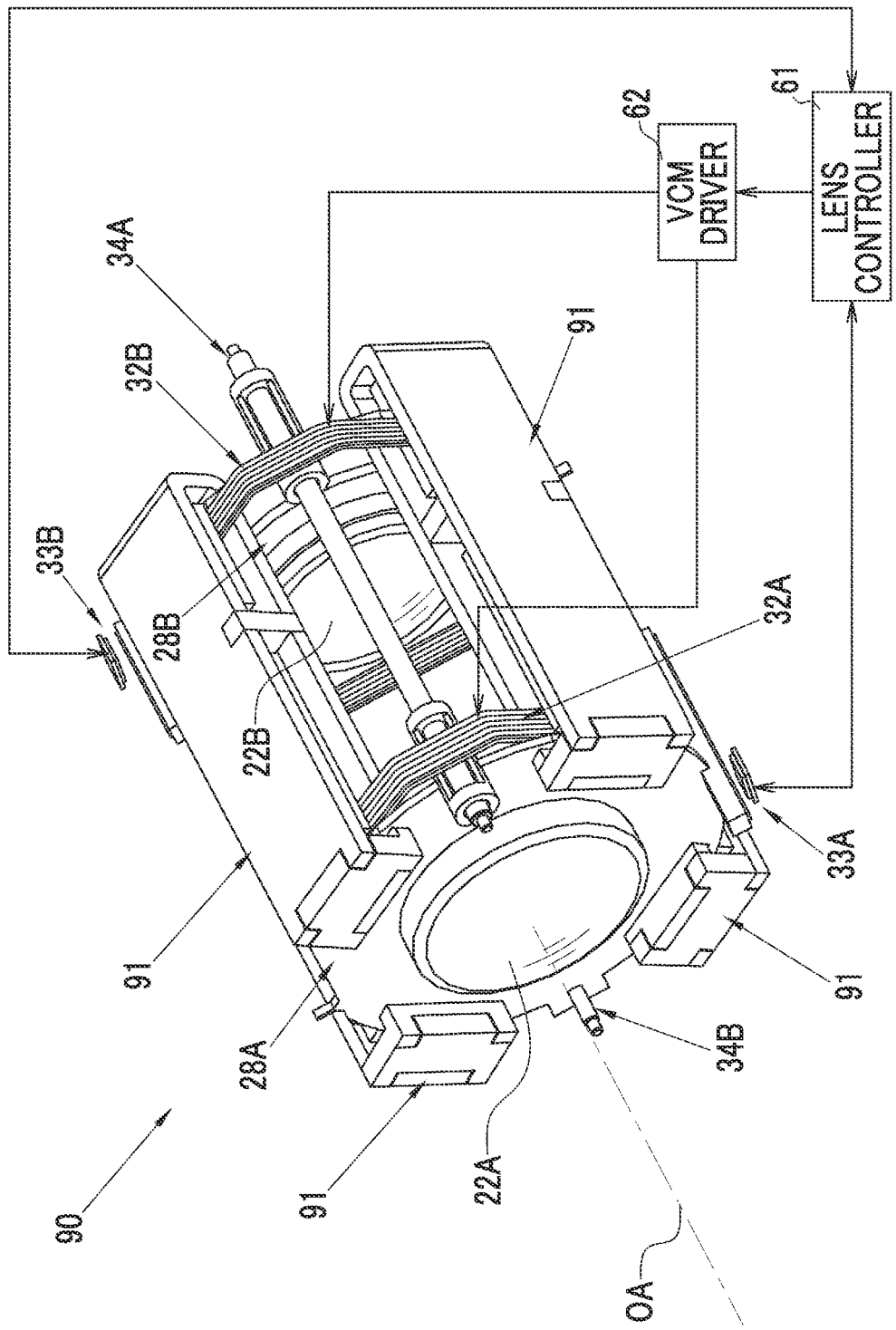
FIG. 17 is a perspective view of a drive device in a second embodiment.

As shown in FIG. 17, a drive device 90 in the present embodiment comprises four magnetic circuit units 91. The drive device 90 is disposed inside the lens barrel 12 and drives the first zoom lens 22A and the second zoom lens 22B which are a part of the imaging optical system 22, similarly to the drive device 23 in the first embodiment. It should be noted that the magnetic circuit unit 91 corresponds to a first member within the scope of the claims. Moreover, the configurations other than the magnetic circuit unit 91 are the same as those of the drive device 23 in the first embodiment, and the same components are designated by the same reference numerals and the description thereof will be omitted.

Figure 18:
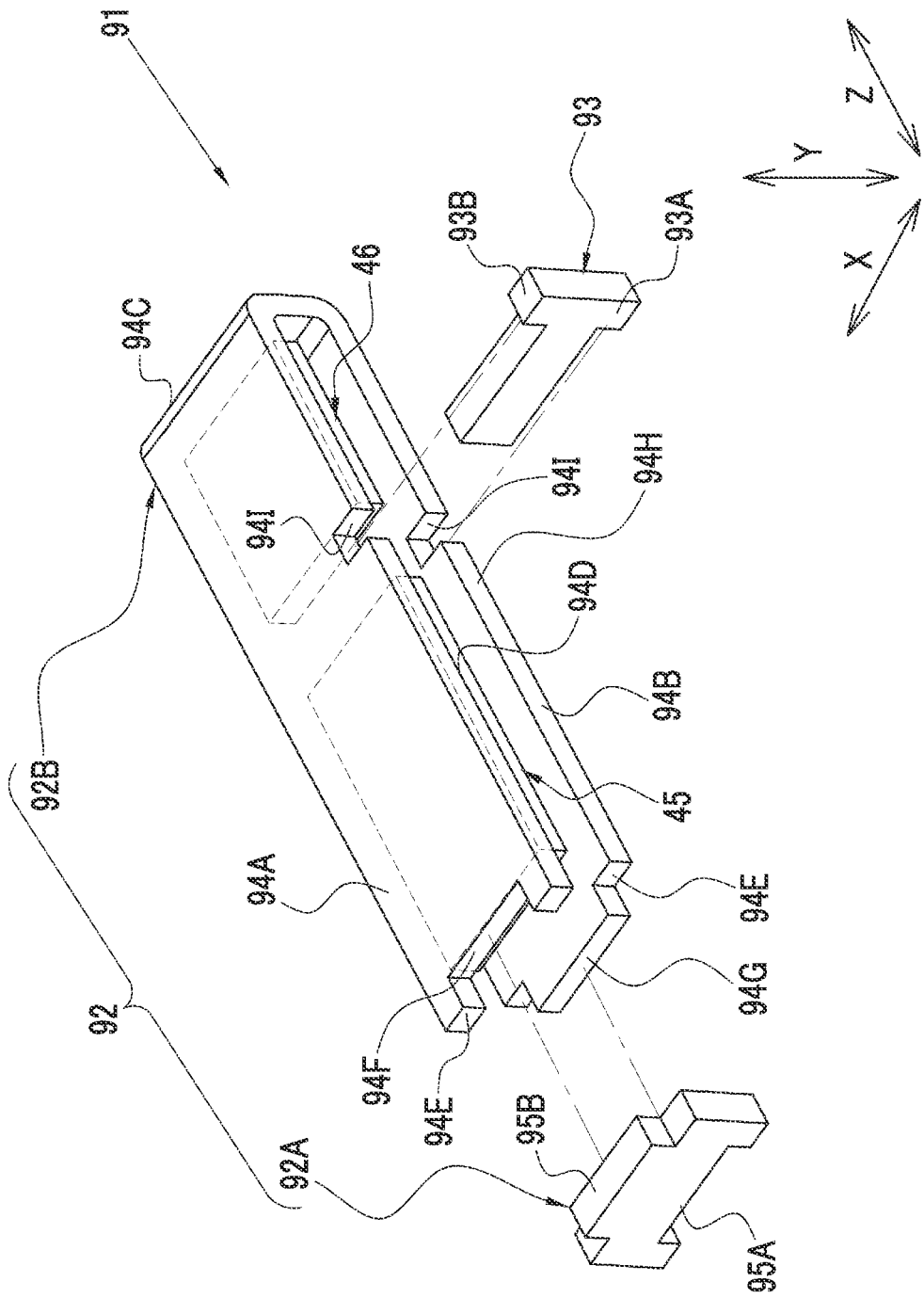
FIG. 18 is an exploded perspective view of a first yoke, a second yoke, a first magnet, and a second magnet in the second embodiment.

As shown in FIG. 18, the magnetic circuit unit 91 comprises the first magnet 45, the second magnet 46, a first yoke 92, and a second yoke 93. The first yoke 92 and the second yoke 93 are formed of a magnetic material, such as iron. The first yoke 92 is composed of a first yoke 92A and a first yoke 92B.

The first yoke 92A is formed in a bent shape. Specifically, the first yoke 92A is formed in a U-shape. The first yoke 92A has an outer flat plate portion 94A, an inner flat plate portion 94B, and a folded-back portion 94C connecting the flat plate portions 94A and 94B. The outer and inner flat plate portions 94A and 94B extend in the optical axis direction. An inner side surface (surface on the optical axis OA side) of the outer flat plate portion 94A is an installation surface 94D, and the first magnet 45 and the second magnet are fixed to the installation surface 94D.

The first magnet 45 and the second magnet 46 fixed to the first yoke 92A are disposed along the Z-axis direction. The first magnet 45 and the second magnet are fixed to the installation surface 94D by, for example, adhesion with an adhesive. The installation surface 94D extends in the Z-axis direction. The first yoke 92A is attached to the inside of the lens barrel body 21 by, for example, screwing, adhesion with an adhesive, or press-fitting.

In the first yoke 92A, the folded-back portion 94C is located on the base end side, and an open end 94E is located on the base end side. A recess portion 94F that is recessed from the end surface to the base end side is formed in one open end 94E (one end of the outer flat plate portion 94A). A protruding portion 94G that protrudes from the end surface to the distal end side is formed on the other open end 94E (one end of the inner flat plate portion 94B).

The first yoke 92A has a side surface 94H and a groove portion 94I. The side surface 94H is a surface disposed along the Z-axis direction. Specifically, the side surface 94H is one of the end surfaces of the flat plate portions 94A and 94B and the folded-back portion 94C in the X-axis direction. The groove portion 94I is a groove portion which is provided on the side surface 94H, is located between the first magnet 45 and the second magnet 46 in the Z-axis direction, and is disposed along the Y-axis direction.

In the first yoke 92A, the inner flat plate portion 94B is inserted into the through-hole 41C of the first holding member 28A and the through-hole 42C of the second holding member 28B. As a result, as in the first embodiment, the first coil 32A is disposed at the position corresponding to the first magnet 45, and the second coil 32B is disposed at the position corresponding to the second magnet 46.

The first yoke 92B is disposed at the distal end portion of the first yoke 92A in the Z-axis direction. The first yoke 92B is disposed along the Y-axis direction and the X-axis direction. The first yoke 92B is formed with a recess portion 95A that is recessed from the inner end surface in the Y-axis direction and a protruding portion 95B that protrudes from the outer end surface. In the first yoke 92B, the protruding portion 95B is fitted into the recess portion 94F of the first yoke 92A, and the recess portion 95A is fitted into the protruding portion 94G of the first yoke 47B. As a result, the first yoke 92A and the first yoke 92B are bonded to each other.

The second yoke 93 is disposed along the Y-axis direction and the X-axis direction. That is, the second yoke 93 is disposed in parallel with the first yoke 92B. The second yoke 93 is formed in a T-shape having the protruding portions 93A and 93B that protrude from the inner and outer end surfaces in the Y-axis direction. In the second yoke 93, the protruding portions 93A and 93B are fitted into the groove portion 94I of the first yoke 92A and are inserted into the inside of the first yoke 92A. That is, the second yoke 93 is disposed in the groove portion 94I. As a result, the first yoke 92A and the second yoke 93 are bonded to each other.

A thickness dimension of the second yoke 93 is formed to be larger than a thickness dimension of the first yoke 92, as in the first embodiment. It should be noted that, regarding the bonding between the first yoke 92A, the first yoke 92B, and the second yoke 93, the first yoke 92A, the first yoke 92B, and the second yoke 93 may be bonded to each other by only fitting between the protruding portion 95B and the recess portion 94F, fitting between the recess portion 95A and the protruding portion 94G, and fitting between the protruding portions 93A and 93B, and the groove portion 94I, or may be bonded by a combination of these fittings and adhesion with an adhesive.

As described above, similarly to the drive device 23 in the first embodiment, in the drive device 90, the first yoke 92 that holds the first magnet 45 and the second magnet 46, and the common second yoke 93 disposed between the first magnet 45 and the second magnet 46 are provided, so that it is possible to efficiently obtain the thrust in a case in which the first coil 32A and the second coil 32B are driven, and it is possible to reduce the weight and the size of the drive device 90, by extension, the lens barrel 12. Further, the thickness dimension of the second yoke 93 is formed to be larger than the thickness dimension of the first yoke 92, so that it is possible to prevent the magnetic flux from being saturated. As a result, the magnetic fluxes of the first magnet 45 and the second magnet 46 can be efficiently used as the thrust of the first coil 32A and the second coil 32B. Therefore, the drive device 90 and the lens barrel 12 can be further reduced in weight and size.

Figure 19:
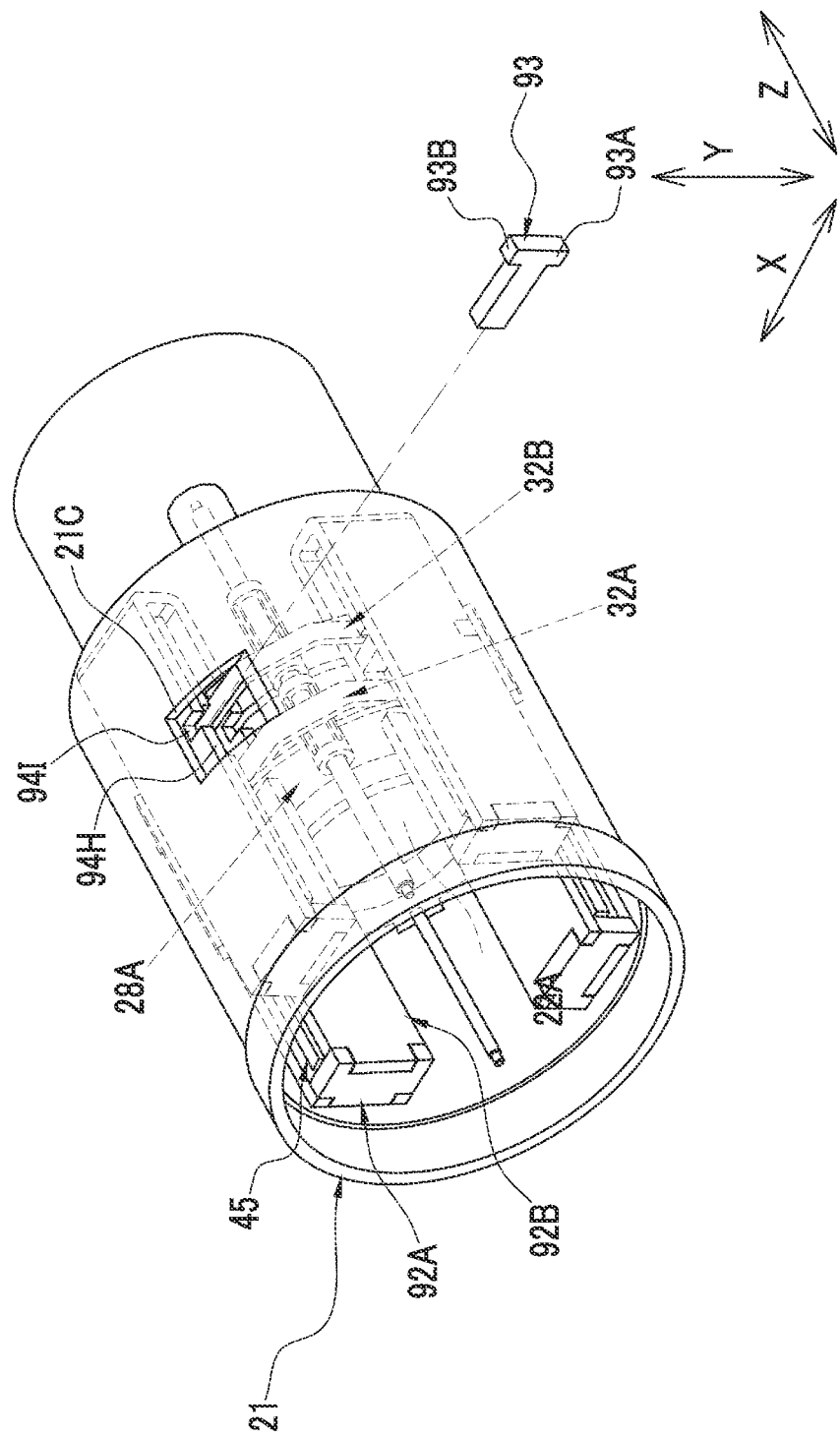
FIG. 19 is a perspective view showing a configuration of a lens barrel body in a modification example.

As a modification example of the second embodiment, as shown in FIG. 19, an opening portion 21C for inserting the second yoke 93 may be formed in the lens barrel body 21. As described above, the first yoke 92A is attached to the inside of the lens barrel body 21. That is, the lens barrel body 21 is a support member that supports the first yoke 92A. The first yoke 92A is attached to the lens barrel body 21 earlier than the second yoke 93 in an assembly step. It should be noted that the example shown in FIG. 19 shows a state in which the first zoom lens 22A, the second zoom lens 22B, the first holding member 28A, the second holding member 28B, the first coil 32A, the second coil 32B, the first magnet 45, and the second magnet 46 are disposed inside the lens barrel body 21, as in the first embodiment.

The opening portion 21C is a through-hole that penetrates from the outside to the inside of the lens barrel body 21 along a direction (X-axis direction) orthogonal to the side surface 94H of the first yoke 92A, and is formed in accordance with the position of the groove portion 94I of the first yoke 92A. That is, the second yoke 93 can be inserted into the groove portion 94I from the X-axis direction through the opening portion 21C.

As described above, the first yoke 47A is inserted into the through-hole 41C of the first holding member 28A and the through-hole 42C of the second holding member 28B, and the first coil 32A and the second coil 32B are disposed at positions corresponding to the first magnet 45 and the second magnet 46. All ways of the assembly work thereof are to move the components along the Z-axis direction, and it is efficient to perform the work in a step earlier than the second yoke 93. Moreover, since the lens barrel body 21 has a cylindrical shape along the Z-axis direction, it is easier to perform work of moving the component along the Z-axis direction.

Then, the second yoke 93 can be inserted into the groove portion 94I from the X-axis direction through the opening portion 21C in a state in which the first zoom lens 22A, the second zoom lens 22B, the first yoke 47A, the first yoke 47B, the first magnet 45, the second magnet 46, the first holding member 28A, the second holding member 28B, the first coil 32A, the second coil 32B, and the like are disposed inside the lens barrel body 21. In this way, the assembly work can be made more efficient, and the productivity of the lens barrel 12 is improved.

In each of the embodiments described above, the hardware structure of the processing unit that executes various types of processing, such as the lens controller 61 and the camera body controller 71, is various processors as shown below. The various processors include a central processing unit (CPU), which is a general-purpose processor that executes software (program) and functions as various processing units, a graphical processing unit (GPU), a programmable logic device (PLD), which is a processor of which a circuit configuration can be changed after the manufacture, such as a field programmable gate array (FPGA), and a dedicated electric circuit, which is a processor having a circuit configuration specifically designed to execute various types of processing.

One processing unit may be composed of one of these various processors, or may be composed of a combination of two or more same or different types of processors (for example, a plurality of FPGAs, a combination of a CPU and an FPGA, or a combination of a CPU and a GPU). Moreover, a plurality of the processing units may be composed of one processor. As an example in which the plurality of processing units are composed of one processor, first, there is a form in which one processor is composed of a combination of one or more CPUs and software, and this processor functions as the plurality of processing units, as represented by a computer, such as a client or a server. Second, as represented by a system on chip (SoC) or the like, there is a form in which a processor, which realizes the functions of the entire system including the plurality of processing units with a single integrated circuit (IC) chip, is used. In this way, various processing units are composed of one or more of the various processors described above as the hardware structure.

More specifically, the hardware structure of these various processors is an electric circuit (circuitry) in a form of a combination of circuit elements, such as semiconductor elements.

It should be noted that, in each of the embodiments described above, the first zoom lens 22A and the second zoom lens 22B are described as an example of the optical system driven by the drive device. However, the present invention is not limited to this, and a drive device that drives another optical system may be applied. Moreover, the optical device according to the embodiment of the present invention can be applied to a lens barrel of a smartphone, a video camera, or the like, in addition to the lens barrel of the digital camera.

EXPLANATION OF REFERENCES

10: digital camera
11: camera body
11A: grip portion
12: lens barrel
13: lens mount
13A: imaging aperture
14: release switch
16: imaging element
17: body-side signal contact
21: lens barrel body
21A, 21B: fixing hole
21C: opening portion
22: imaging optical system
22A: first zoom lens
22B: second zoom lens
22C: optical system of first group
22D: optical system of fourth group
23: drive device
24: zoom ring
25: lens mount
26: lens-side signal contact
27: attachment member
27A, 27B: fixing hole
28A: first holding member
28B: second holding member
31: magnetic circuit unit
31A to 31D: magnetic circuit unit
32A: first coil
32B: second coil
33A: first position detection sensor
33B: second position detection sensor
34A: first guide shaft
34B: second guide shaft
41A: cylindrical portion
41B: flange portion
41C: through-hole
41D: guide tube
41E: guide groove
41F: sensor holding portion
42A: cylindrical portion
42B: flange portion
42C: through-hole
42D: guide tube
42E: guide groove
42F: sensor holding portion
45: first magnet
46: second magnet
47: first yoke
47A, 47B: first yoke
48: second yoke
48A, 48B: protruding portion
48C, 48D: recess portion
51A, 52A: outer flat plate portion
51B, 52B: inner flat plate portion
51C: folded-back portion
51D: installation surface
51E: open end
51F: recess portion
52C: folded-back portion
52D: installation surface
52E: open end
52F: protruding portion
55: position detection magnet
56: magnetic sensor
61: lens controller
62: VCM driver
63: motor driver
64: motor
65: stop unit
65A: stop leaf blade
71: camera body controller
72: shutter unit
73: shutter motor
74: motor driver
75: image memory
76: busline
77: image data processing unit
78: LCD driver
79: image display unit
81: card I/F (interface)
82: memory card
84: AE (automatic exposure) processing unit
90: drive device
91: magnetic circuit unit
92: first yoke
92A: first yoke
92B: first yoke
93: second yoke
93A, 93B: protruding portion
94A: outer flat plate portion
94B: inner flat plate portion
94C: folded-back portion
94D: installation surface
94E: open end
94F: recess portion
94G: protruding portion
94H: side surface
94I: groove portion
95A: recess portion
95B: protruding portion
H1: length dimension
OA: optical axis
T1: thickness dimension
t1 to t4: thickness dimension
t5: thickness dimension
W1: width dimension

What is claimed is:

1. A drive device that drives a first optical system and a second optical system disposed along an optical axis direction, the device comprising:
a first member including a first magnet, a second magnet disposed along the optical axis direction together with the first magnet, a first yoke that holds the first magnet and the second magnet, and a second yoke disposed between the first magnet and the second magnet;
a first coil that is bonded to the first optical system and corresponds to the first magnet; and a second coil that is bonded to the second optical system and corresponds to the second magnet, wherein the first member drives the first coil by an electromagnetic force generated in the first coil and drives the second coil by an electromagnetic force generated in the second coil, a thickness of the second yoke is larger than a thickness of the first yoke, wherein, in a case in which dimensions of the first magnet and the second magnet in the optical axis direction are length dimensions, dimensions of the first optical system and the second optical system in a tangential direction of a circle about an optical axis are width dimensions, a dimension in a radial direction intersecting the optical axis direction and the tangential direction is a thickness dimension, and a force generated by energizing the first coil and the second coil is a thrust, and the width dimensions are set to dimensions in which a ratio of an increase amount of the thrust to an increase amount of the width dimension is equal to or more than a threshold value in a case in which the length dimensions and the thickness dimension are fixed values.

2. The drive device according to claim 1,
wherein the first yoke has a division portion at a position between the first magnet and the second magnet in the optical axis direction, and
the second yoke is provided in the division portion.

3. The drive device according to claim 2,
wherein the second yoke is interposed between the first yokes divided at the position of the division portion.

4. The drive device according to claim 1,
wherein the first yoke has:
a side surface disposed along the optical axis direction; and
a groove portion that is located between the first magnet and the second magnet in the optical axis direction and is provided on the side surface, and
the second yoke is disposed in the groove portion.

5. The drive device according to claim 1,
wherein at least one of the first optical system or the second optical system has a weight equal to or more than 20 g and a dimension in the optical axis direction equal to or more than 15 mm.

6. The drive device according to claim 1, further comprising:
a first holding member that holds the first optical system and the first coil; and
a second holding member that holds the second optical system and the second coil,
wherein the first coil and the second coil interpose the second yoke and are disposed at positions facing each other,
the first holding member includes a first holding portion that holds the first coil at a position opposite to the second yoke with respect to the first coil, and
the second holding member includes a second holding portion that holds the second coil at a position opposite to the second yoke with respect to the second coil.

7. The drive device according to claim 1,
wherein any one of the first yoke or the second yoke is formed with a protruding portion and the other thereof is formed with a recess portion, and
the first yoke and the second yoke are bonded to each other by fitting the protruding portion into the recess portion.

8. An optical device comprising:
the drive device according to claim 1.

9. A drive device that drives a first optical system and a second optical system disposed along an optical axis direction, the device comprising:
a first member including a first magnet, a second magnet disposed along the optical axis direction together with the first magnet, a first yoke that holds the first magnet and the second magnet, and a second yoke disposed between the first magnet and the second magnet;
a first coil that is bonded to the first optical system and corresponds to the first magnet;
a second coil that is bonded to the second optical system and corresponds to the second magnet; and
a position detection sensor,
wherein the first member drives the first coil by an electromagnetic force generated in the first coil and drives the second coil by an electromagnetic force generated in the second coil,
a thickness of the second yoke is larger than a thickness of the first yoke,
wherein the position detection sensor includes:
a first position detection sensor that detects the position of the first optical system; and
a second position detection sensor that detects the position of the second optical system,
the first position detection sensor and the second position detection sensor have different positions in a circumferential direction about the optical axis,
wherein the first members are disposed in pairs at positions of the first optical system and the second optical system facing each other with an optical axis interposed therebetween, and
the position detection sensor is located between the first members disposed in pairs and detects the positions of the first optical system and the second optical system.

10. A drive device that drives a first optical system and a second optical system disposed along an optical axis direction, the device comprising:
a first member including a first magnet, a second magnet disposed along the optical axis direction together with the first magnet, a first yoke that holds the first magnet and the second magnet, and a second yoke disposed between the first magnet and the second magnet;
a first coil that is bonded to the first optical system and corresponds to the first magnet; and
a second coil that is bonded to the second optical system and corresponds to the second magnet,
wherein the first member drives the first coil by an electromagnetic force generated in the first coil and drives the second coil by an electromagnetic force generated in the second coil,
a thickness of the second yoke is larger than a thickness of the first yoke,
wherein, in a case in which dimensions of the first magnet and the second magnet in the optical axis direction are length dimensions, dimensions of the first optical system and the second optical system in a tangential direction of a circle about an optical axis are width dimensions, a dimension in a radial direction intersecting the optical axis direction and the tangential direction is a thickness dimension, and a force generated by energizing the first coil and the second coil is a thrust,
the width dimensions are set to dimensions in which a ratio of an increase amount of the thrust to an increase amount of the width dimension is equal to or more than a threshold value in a case in which the length dimensions and the thickness dimension are fixed values, and wherein the first magnet and the second magnet have the width dimensions in which the ratio is equal to or more than the threshold value, and a plurality of the first magnets and a plurality of the second magnets are disposed in a circumferential direction of the circle, respectively.

11. A drive device that drives a first optical system and a second optical system disposed along an optical axis direction, the device comprising:

a first member including a first magnet, a second magnet disposed along the optical axis direction together with the first magnet, a first yoke that holds the first magnet and the second magnet, and a second yoke disposed between the first magnet and the second magnet;

a first coil that is bonded to the first optical system and corresponds to the first magnet; and a second coil that is bonded to the second optical system and corresponds to the second magnet, wherein the first member drives the first coil by an electromagnetic force generated in the first coil and drives the second coil by an electromagnetic force generated in the second coil, a thickness of the second yoke is larger than a thickness of the first yoke, wherein, in a case in which dimensions of the first magnet and the second magnet in the optical axis direction are length dimensions, dimensions of the first optical system and the second optical system in a tangential direction of a circle about an optical axis are width dimensions, a dimension in a radial direction intersecting the optical axis direction and the tangential direction is a thickness dimension, and a force generated by energizing the first coil and the second coil is a thrust, the width dimensions are set to dimensions in which a ratio of an increase amount of the thrust to an increase amount of the width dimension is equal to or more than a threshold value in a case in which the length dimensions and the thickness dimension are fixed values, and wherein the length dimensions are set in accordance with movement amounts of the first optical system and the second optical system, respectively.

12. A drive device that drives a first optical system and a second optical system disposed along an optical axis direction, the device comprising:

a first member including a first magnet, a second magnet disposed along the optical axis direction together with the first magnet, a first yoke that holds the first magnet and the second magnet, and a second yoke disposed between the first magnet and the second magnet;

wherein the first yoke has:

a side surface disposed along the optical axis direction; and a groove portion that is located between the first magnet and the second magnet in the optical axis direction and is provided on the side surface, and the second yoke is disposed in the groove portion;

a support member that supports the first yoke, wherein the support member has an opening portion for inserting the second yoke into the groove portion from a direction orthogonal to the side surface;

a first coil that is bonded to the first optical system and corresponds to the first magnet; and a second coil that is bonded to the second optical system and corresponds to the second magnet, wherein the first member drives the first coil by an electromagnetic force generated in the first coil and drives the second coil by an electromagnetic force generated in the second coil, and a thickness of the second yoke is larger than a thickness of the first yoke.

* * * * *